US012601819B2

(12) United States Patent　　　(10) Patent No.: US 12,601,819 B2
Caspall　　　　　　　　　　　　(45) Date of Patent: Apr. 14, 2026

(54) SONAR SYSTEM INCLUDING TRANSDUCER ELEMENTS WITH A GAP THEREBETWEEN

(71) Applicant: Navico, Inc., Tulsa, OK (US)

(72) Inventor: Jayme J. Caspall, Tulsa, OK (US)

(73) Assignee: Navico, Inc., Tulsa, OK (US)

( * ) Notice: Subject to any disclaimer, the term of this patent is extended or adjusted under 35 U.S.C. 154(b) by 330 days.

(21) Appl. No.: 18/450,481

(22) Filed: Aug. 16, 2023

(65) Prior Publication Data

US 2025/0060465 A1　　Feb. 20, 2025

(51) Int. Cl.
| | |
|---|---|
| *G01S 7/521* | (2006.01) |
| *B06B 1/20* | (2006.01) |
| *G01S 7/524* | (2006.01) |
| *G10K 11/28* | (2006.01) |
| *G01S 15/89* | (2006.01) |

(52) U.S. Cl.
CPC ............... *G01S 7/521* (2013.01); *B06B 1/20* (2013.01); *G01S 7/524* (2013.01); *G10K 11/28* (2013.01); *B06B 2201/55* (2013.01); *B06B 2201/74* (2013.01); *G01S 15/89* (2013.01); *G10K 2200/11* (2013.01)

(58) Field of Classification Search
CPC .......... G01S 7/521; G01S 7/524; G01S 15/89; B06B 1/20; B06B 2201/55; B06B 2201/74; G10K 11/28
See application file for complete search history.

(56) References Cited

U.S. PATENT DOCUMENTS

| | | | |
|---|---|---|---|
| 3,243,768 A | 3/1966 | Roshon et al. | |
| 4,031,502 A | 6/1977 | Lefaudeux et al. | |
| 4,314,098 A * | 2/1982 | Maerfeld ............... | H04R 1/406 |
| | | | 381/163 |
| 4,719,605 A | 1/1988 | Eder et al. | |
| 8,300,499 B2 | 10/2012 | Coleman et al. | |
| 11,397,263 B2 | 7/2022 | Caspall | |
| 2021/0270963 A1 * | 9/2021 | Caspall ................... | G01S 15/42 |

* cited by examiner

*Primary Examiner* — Abdallah Abulaban
(74) *Attorney, Agent, or Firm* — Nelson Mullins Riley & Scarborough LLP

(57) ABSTRACT

Sonar systems and related methods are provided. A sonar system for generating one or more sonar images includes first and second transducer elements each having at least one emitting face. The sonar system also includes a sonar signal processor in electronic communication with the first and second transducer elements to cause transmission of signals from the first and second transducer elements to cause at least one first acoustic beam to be emitted from the first emitting face in a first beam direction and at least one second acoustic beam to be emitted from the second emitting face in a second beam direction. The first and second transducer elements are positioned such that a gap is formed therebetween. The gap is configured to facilitate movement of a fluid therein so as to contribute to an emission of sound power in both the first beam direction and the second beam direction.

19 Claims, 13 Drawing Sheets

SONAR SYSTEM INCLUDING TRANSDUCER ELEMENTS WITH A GAP THEREBETWEEN

FIELD OF THE INVENTION

Embodiments of the present invention relate generally to the operation of sonar transducers, and more particularly, to systems and methods for operating sonar transducer assemblies utilizing transducer elements with a gap therebetween.

BACKGROUND

Sonar has long been used to detect waterborne or underwater objects. For example, sonar devices may be used to determine depth and bottom topography, detect fish or other waterborne contacts, locate wreckage, etc. In this regard, due to the extreme limits to visibility underwater, sonar is typically the most accurate way for individuals to locate objects underwater. Sonar transducer elements, or simply transducers, produce sound or vibrations at a particular frequency that is transmitted into and through the water and also to detect echo returns from the transmitted sound that return to the transducer after reflecting off an object. The transducers can convert electrical energy into sound energy and also convert sound energy (e.g., via detected pressure changes) into an electrical signal, although some transducers may act only as a hydrophone for converting sound energy into an electrical signal without having a transmitting capability. The transducers are often made using piezoelectric materials.

A typical transducer produces a beam pattern that emanates as a sound pressure signal from a small source such that the sound energy generates a pressure wave that expands as it moves away from the source. For instance, a circular transducer element (e.g., a cylindrical shaped crystal with a circular face) typically creates a conical shaped beam with the apex of the cone being located at the source. A linear transducer element (e.g., a rectangular prism shaped crystal with a rectangular face) generates a somewhat planar, fan-shaped beam pattern. Any reflected sound then returns to the transducer to form a return signal that may be interpreted as a surface of an object.

BRIEF SUMMARY

In presently available sonar systems, the radiating or emitting face of a transducer element is aimed in the same direction as the desired direction of propagation of the acoustic beam emitted therefrom. For instance, in a "down-scan" transducer, the emitting face may be aimed downward relative to the surface of a body of water on which a vessel operates such that emitted acoustic beams are directed into the water column and toward bottom features substantially directly below the vessel. Also, in certain known sonar systems that employ a cylindrical, or disc, shaped transducer element, although the transmitting crystal has two faces that will radiate or emit acoustic energy, only one of the faces is used for sonar purposes. The non-emitting surfaces are isolated from the water by placing low density, low stiffness materials, such as polyurethane foam, thereon. Thus, acoustic energy reflects back into the transmitting crystal upon hitting these surfaces. However, such transducer element configurations and transducer assemblies suffer from a number of drawbacks. For instance, they suffer from low efficiency and high susceptibility to cracking from high voltage excitation.

In contrast, in some example embodiments of the present invention, a transducer element may be disposed in a position such that its emitting face(s) are rotated (e.g., ninety (90) degrees) relative to a surface of a body of water. Further, another transducer element may be disposed in a position such that its emitting face(s) are rotated (e.g., ninety (90) degrees) relative to the surface of the body of water. As described in more detail herein, the transducer elements may be positioned such that a gap is formed therebetween. The transducer elements may each be configured to propagate an acoustic beam from each emitting face, and the acoustic beams emitted from the emitting faces that face the gap may be contained within the gap to form a plurality of acoustic waves that bounce back and forth within the gap. The bouncing back and forth of the plurality of acoustic waves within the gap may contribute to a transmission of power to any non-trapped acoustic beams, such as the acoustic beams emanating from the other emitting faces that do not face the gap—thereby amplifying the sound power of the acoustic beams.

In some embodiments, a beam reflector may be mounted in a fixed position with respect to the transducer elements. As described in more detail herein, the beam reflector may include one or more beam reflecting surfaces on which emitted acoustic beam(s) impinge and, thereby, the beam reflector may redirect the acoustic beam(s) in a desired direction (e.g., downward below the watercraft, sideways off to the sides of the watercraft, or in any other direction with respect to the watercraft).

In various embodiments, a number of advantages are realized over traditional transducer element and assembly configurations. For example, in some embodiments, an amplification of acoustic beams can be achieved with a compact transducer assembly, which may allow for stronger acoustic beams to be generated in a cost-efficient and space-efficient manner. Further, in some embodiments, an additional one or more acoustic beams can be formed and directed out of the gap. A variety of sonar views can be achieved with the embodiments disclosed herein.

In an example embodiment, a sonar system for generating one or more sonar images of an underwater environment is provided. The sonar system includes a first transducer element, and the first transducer element has at least one first emitting face. The sonar system also includes a second transducer element, and the second transducer element has at least one second emitting face. The sonar system also includes a sonar signal processor in electronic communication with the first transducer element and the second transducer element, and the sonar signal processor is operative to cause transmission of signals from the first transducer element and the second transducer element to cause at least one first acoustic beam to be emitted from the first emitting face in a first beam direction into the underwater environment and at least one second acoustic beam to be emitted from the second emitting face in a second beam direction into the underwater environment. The first transducer element and the second transducer element are positioned such that a gap is formed therebetween. The gap includes fluid, and the gap is configured to facilitate movement of the fluid therein so as to contribute to an emission of sound power in both the first beam direction and the second beam direction.

In some embodiments, the sonar signal processor may be further configured to receive sonar return data generated by receipt of sonar return signals by at least one of the first transducer element or the second transducer element and generate, based on the sonar return data, sonar image data corresponding to generation of at least one sonar image of the underwater environment.

In some embodiments, the at least one first emitting face of the first transducer element may include a first side emitting face and a second side emitting face, and the first side emitting face may be disposed on an opposite side of the first transducer element from the second side emitting face. The at least one second emitting face of the second transducer element may include a third side emitting face and a fourth side emitting face, and the third side emitting face may be disposed on an opposite side of the second transducer element from the fourth side emitting face.

In some embodiments, the sonar signal processor may be operative to cause transmission of signals from the first transducer element and the second transducer element to cause a first acoustic beam to be emitted from the first side emitting face in the first beam direction, a second acoustic beam to be emitted from the second side emitting face into the gap, a third acoustic beam to be emitted from the third side emitting face into the gap, and a fourth acoustic beam to be emitted from the fourth side emitting face in the second beam direction.

In some embodiments, when the second acoustic beam and the third acoustic beam are emitted, the second acoustic beam and the third acoustic beam may be directed into an at least partially enclosed area formed by the gap and then may be directed out of the at least partially enclosed area in a third beam direction.

In some embodiments, the sonar system may further include a beam reflector mounted in a fixed position relative to the first transducer element and the second transducer element, and the beam reflector may include at least one first beam reflecting surface positioned along the first beam direction such that, when the first acoustic beam is emitted, the first acoustic beam impinges upon the at least one first beam reflecting surface and is reflected in a fourth beam direction different than the first beam direction. The beam reflector may include at least one second beam reflecting surface positioned along the second beam direction such that, when the fourth acoustic beam is emitted, the fourth acoustic beam impinges upon the at least one second beam reflecting surface and is reflected in a fifth beam direction different than the second beam direction.

In some embodiments, the fourth beam direction and the fifth beam direction may be vertically downward.

In some embodiments, the at least one first beam reflecting surface and the at least one second beam reflecting surface may be straight.

In some embodiments, the at least one first beam reflecting surface and the at least one second beam reflecting surface may be integrated into one curved beam reflecting surface.

In some embodiments, each of the at least one first beam reflecting surface and the at least one second beam reflecting surface may be formed of a foam material.

In some embodiments, the sonar return signals returned from the underwater environment may be reflected off at least one of the at least one first beam reflecting surface or the at least one second beam reflecting surface prior to being received by the first transducer element or the second transducer element.

In some embodiments, the first transducer element may be positioned at a first angle with respect to a vertical plane, and the second transducer element may be positioned at a second angle with respect to the vertical plane. The at least one first beam reflecting surface may be positioned at a third angle with respect to a horizontal plane, and the at least one second beam reflecting surface may be positioned at a fourth angle with respect to the horizontal plane. The first angle and the second angle may correspond to the third angle and the fourth angle in such a way so as to achieve desired patterns of the first acoustic beam, the second acoustic beam, the third acoustic beam, and the fourth acoustic beam.

In some embodiments, each of the first angle and the second angle may be about 5 degrees, and each of the third angle and the fourth angle may be about 45 degrees.

In some embodiments, the at least one first emitting face of the first transducer element and the at least one second emitting face of the second transducer element may be parallel.

In some embodiments, the first transducer element may include a first foam element configured to focus the at least one first acoustic beam out of the at least one first emitting face, and the second transducer element may include a second foam element configured to focus the at least one second acoustic beam out of the at least one second emitting face.

In some embodiments, the fluid may be comprised of polyurethane.

In some embodiments, each of the first transducer element and the second transducer element may include a piezoelectric ceramic disc.

In some embodiments, each of the at least one first acoustic beam and the at least one second acoustic beam may be conical.

In another example embodiment, a sonar system for generating one or more sonar images of an underwater environment is provided. The sonar system includes a first transducer element, and the first transducer element has a first emitting face and a second emitting face. The first emitting face is disposed on an opposite side of the first transducer element from the second emitting face. The sonar system also includes a second transducer element, and the second transducer element has a third emitting face and a fourth emitting face. The third emitting face is disposed on an opposite side of the second transducer element from the fourth emitting face. The sonar system also includes a sonar signal processor in electronic communication with the first transducer element and the second transducer element, and the sonar signal processor is operative to cause transmission of signals from the first transducer element and the second transducer element to cause a first acoustic beam to be emitted from the first emitting face in a first beam direction, a second acoustic beam to be emitted from the second emitting face in a second beam direction, a third acoustic beam to be emitted from the third emitting face in a third beam direction, and a fourth acoustic beam to be emitted from the fourth emitting face in a fourth beam direction. The first beam direction and the second beam direction intersect, and, when the second acoustic beam and the third acoustic beam are emitted, the second acoustic beam and the third acoustic beam are directed into an at least partially enclosed gap between the first transducer element and the second transducer element.

In another example embodiment, a sonar transducer assembly is provided. The sonar transducer assembly includes a first transducer element, and the first transducer element has at least one first emitting face. The first transducer element is in electronic communication with a sonar signal processor, and the sonar signal processor is operative to cause transmission of signals from the first transducer element to cause at least one first acoustic beam to be emitted from the first emitting face in a first beam direction. The sonar transducer assembly also includes a second transducer element, and the second transducer element has at least one second emitting face. The second transducer element is in electronic communication with the sonar signal processor, and the sonar signal processor is operative to cause transmission of signals from the second transducer element to cause at least one second acoustic beam to be emitted from the second emitting face in a second beam direction. The first transducer element and the second transducer element are positioned such that a gap is formed therebetween. The gap includes fluid, and the gap is configured to facilitate movement of the fluid therein so as to contribute to an emission of sound power in both the first beam direction and the second beam direction.

BRIEF DESCRIPTION OF THE DRAWINGS

Figure 1:
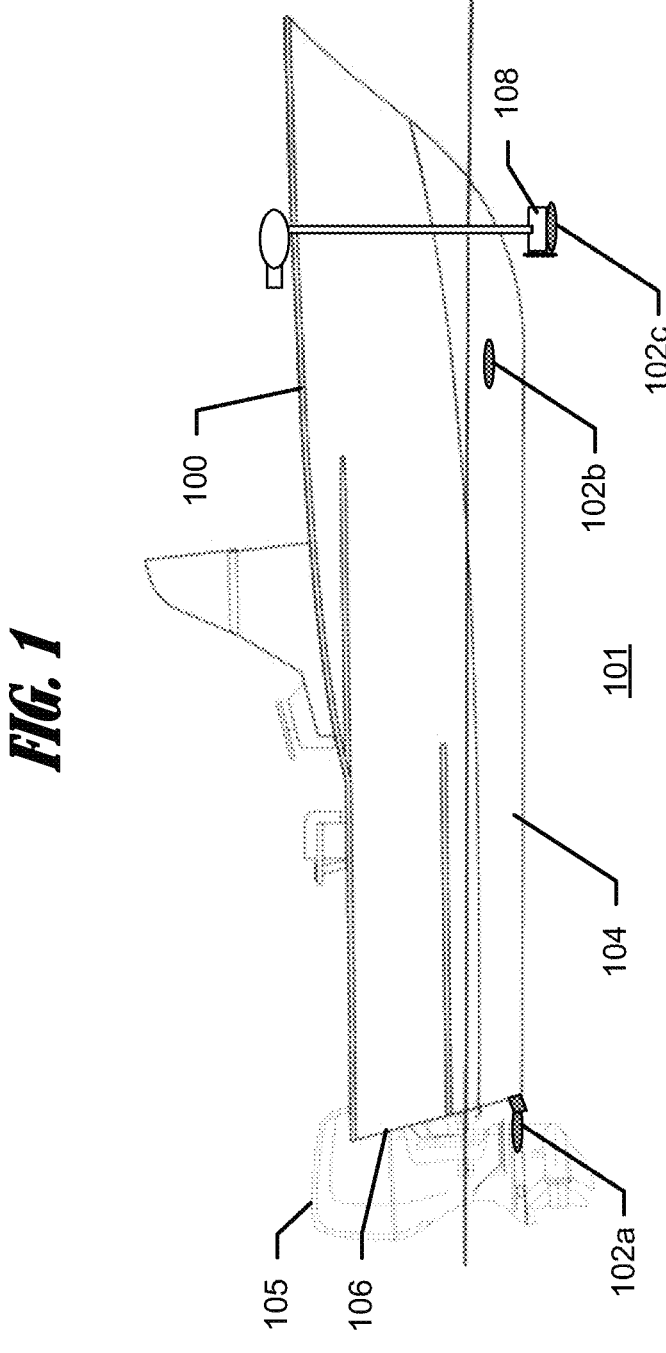
Figure 2:
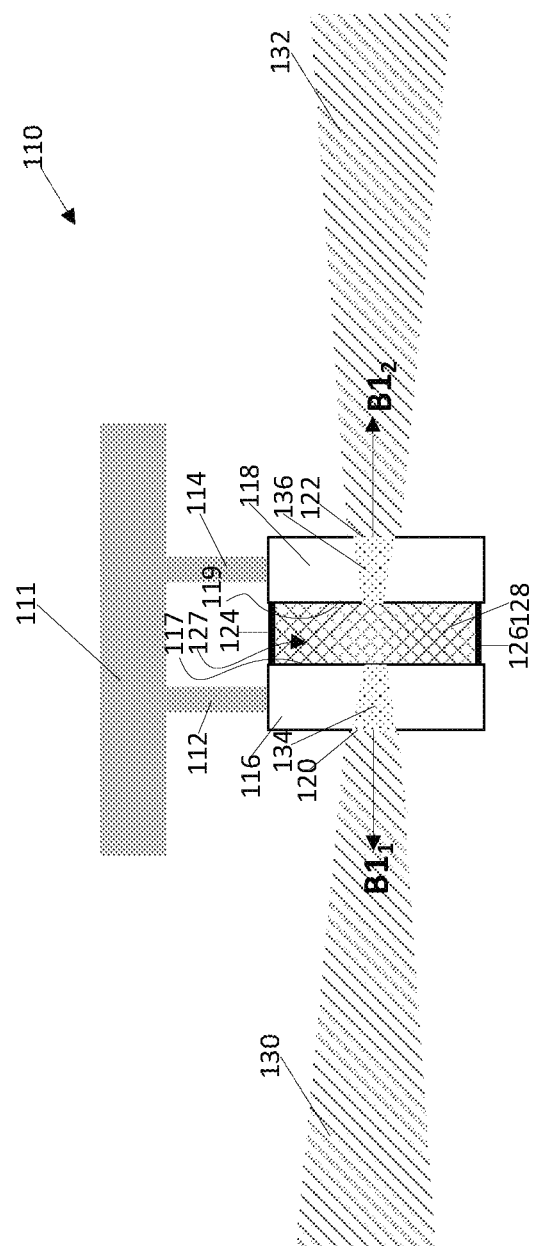
Figure 2:
Figure 3:
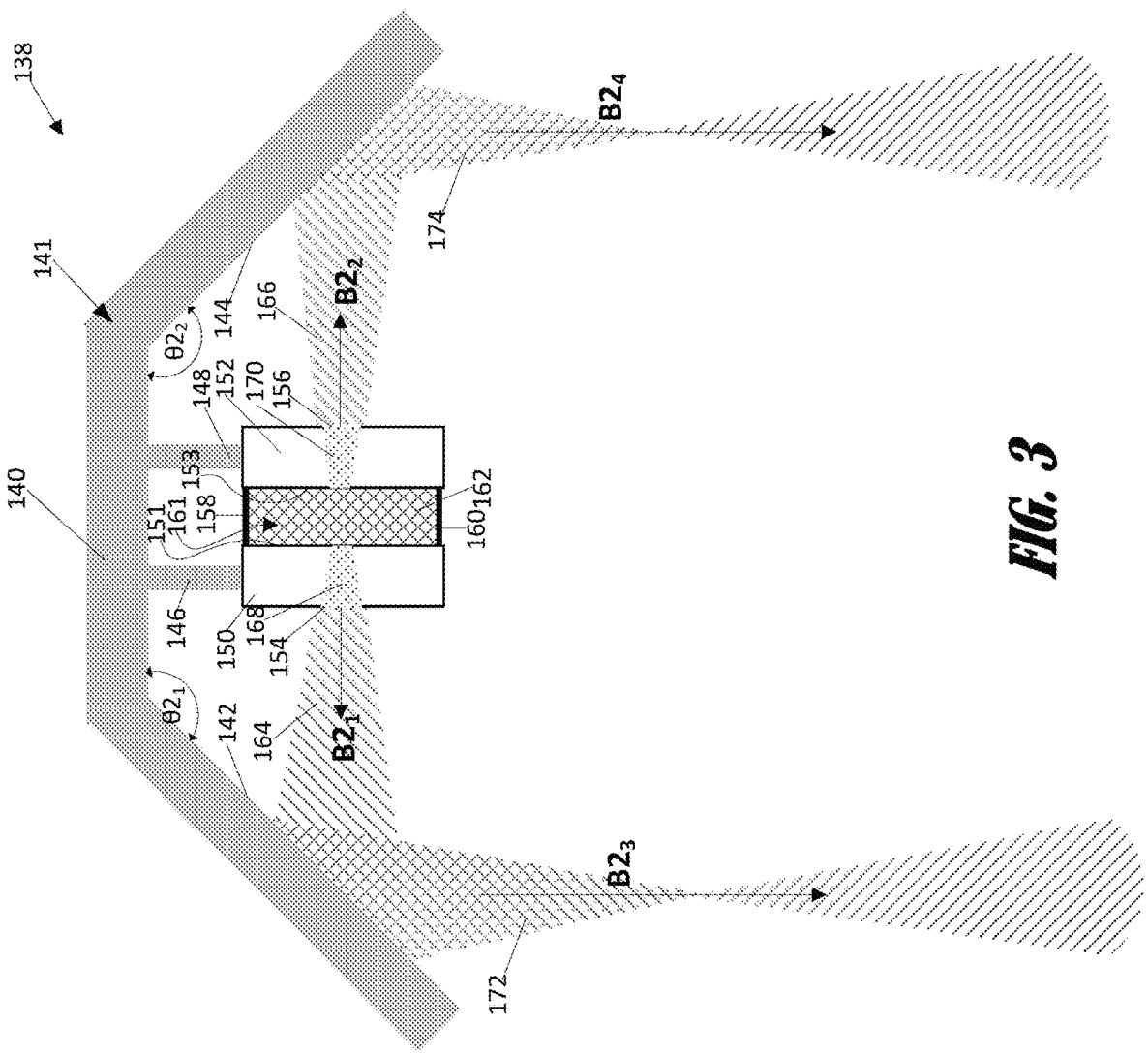
Figure 4:
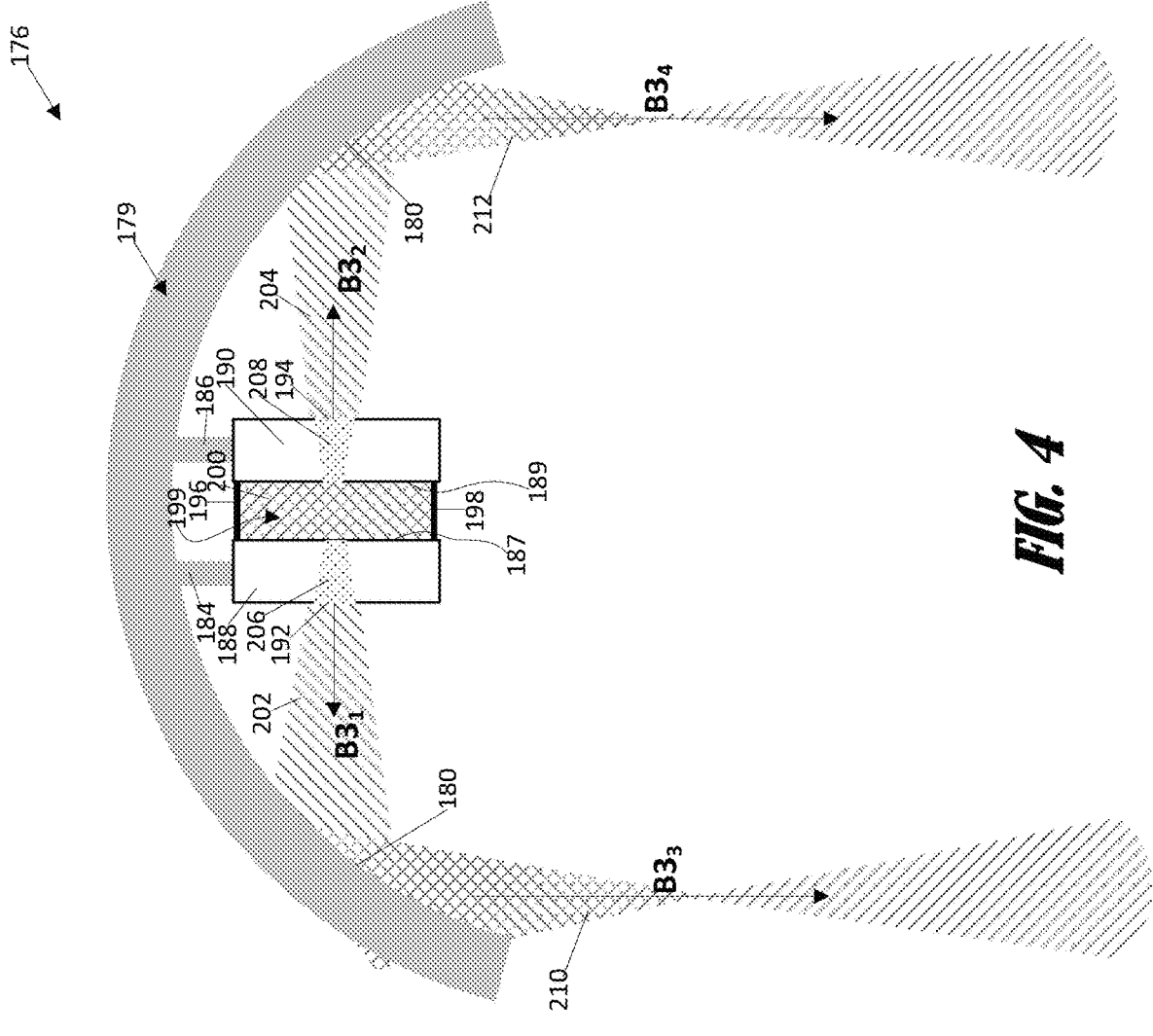
Figure 5:
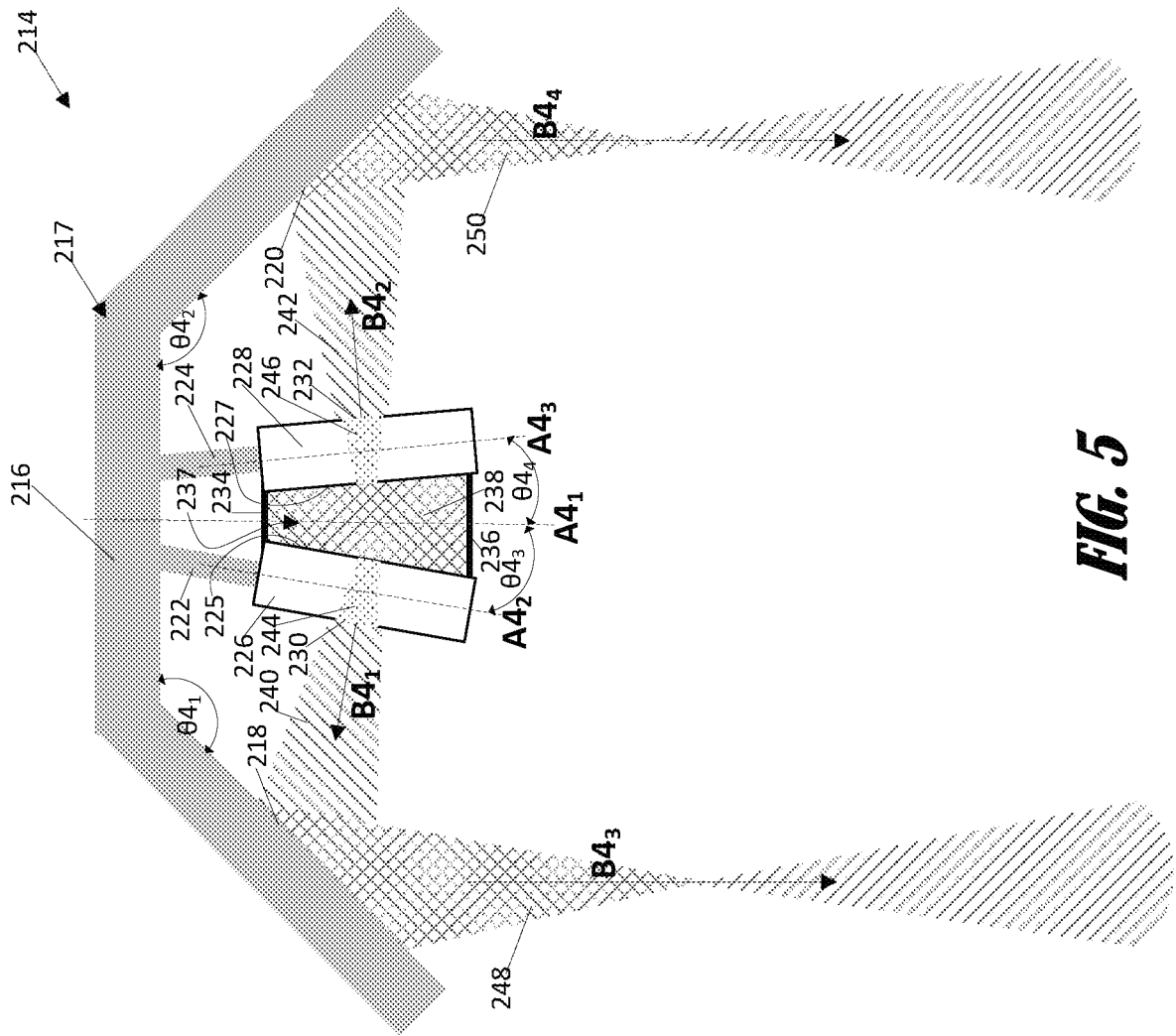
Figure 6:
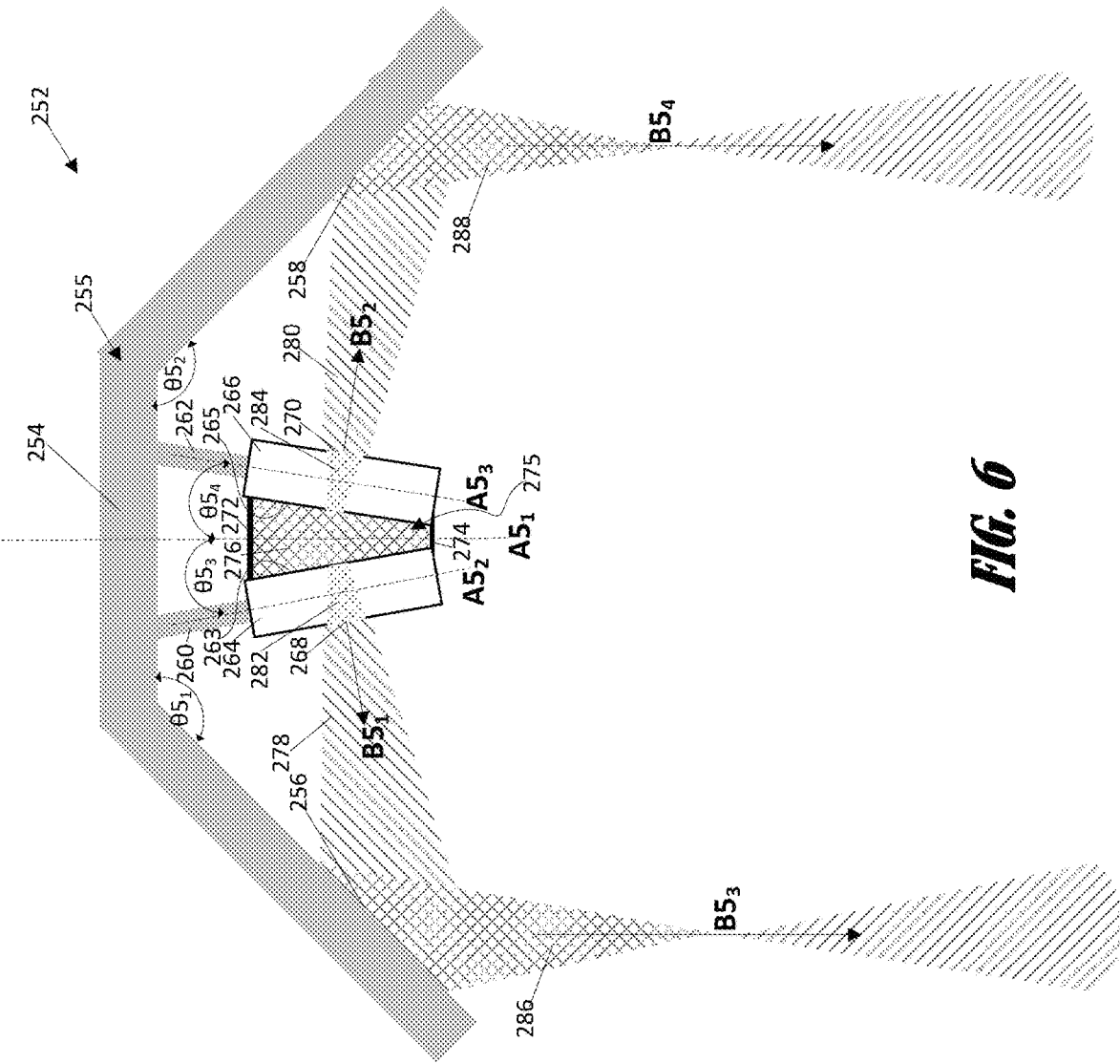
Figure 7:
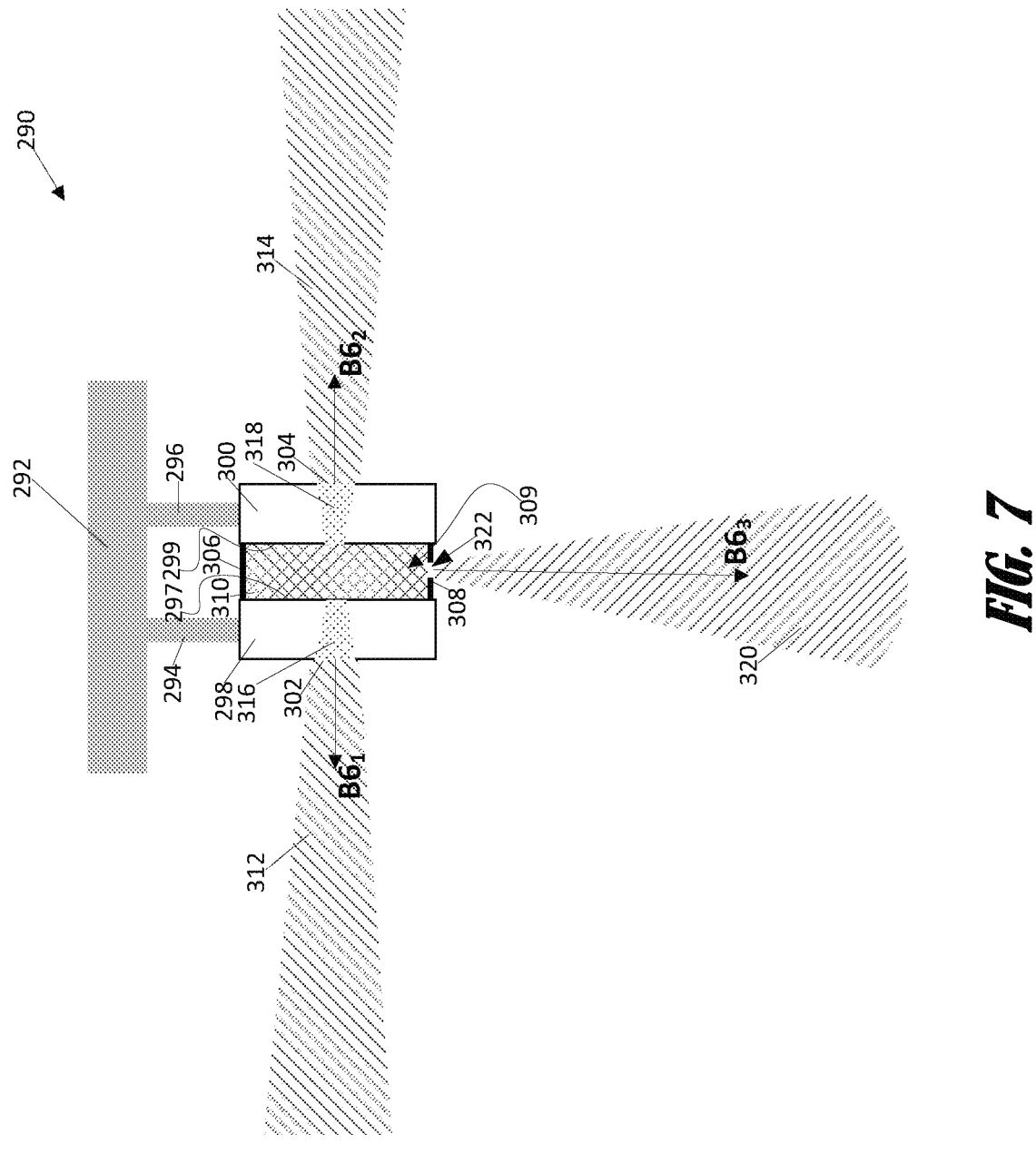
Figure 8:
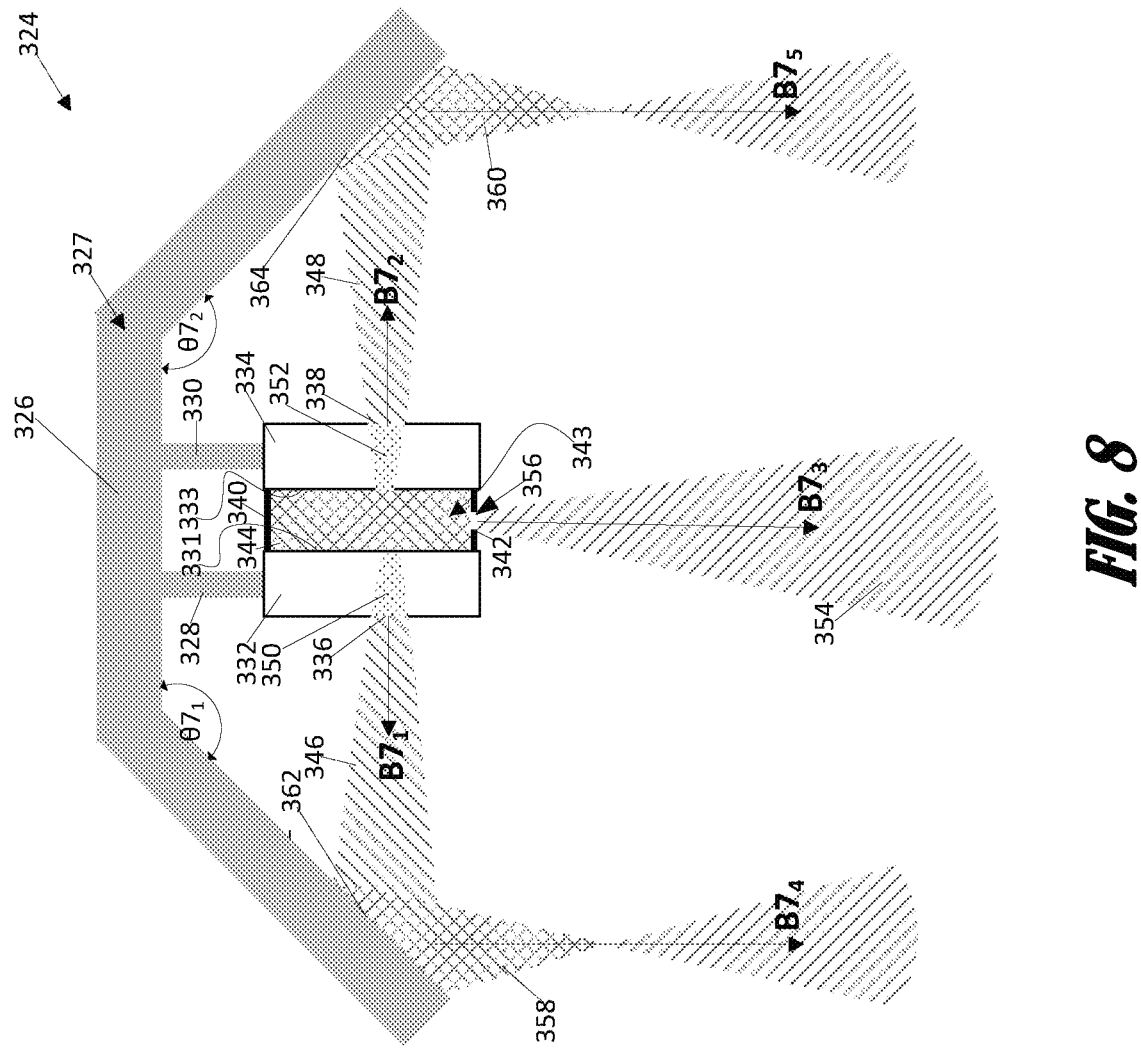
Figure 9:
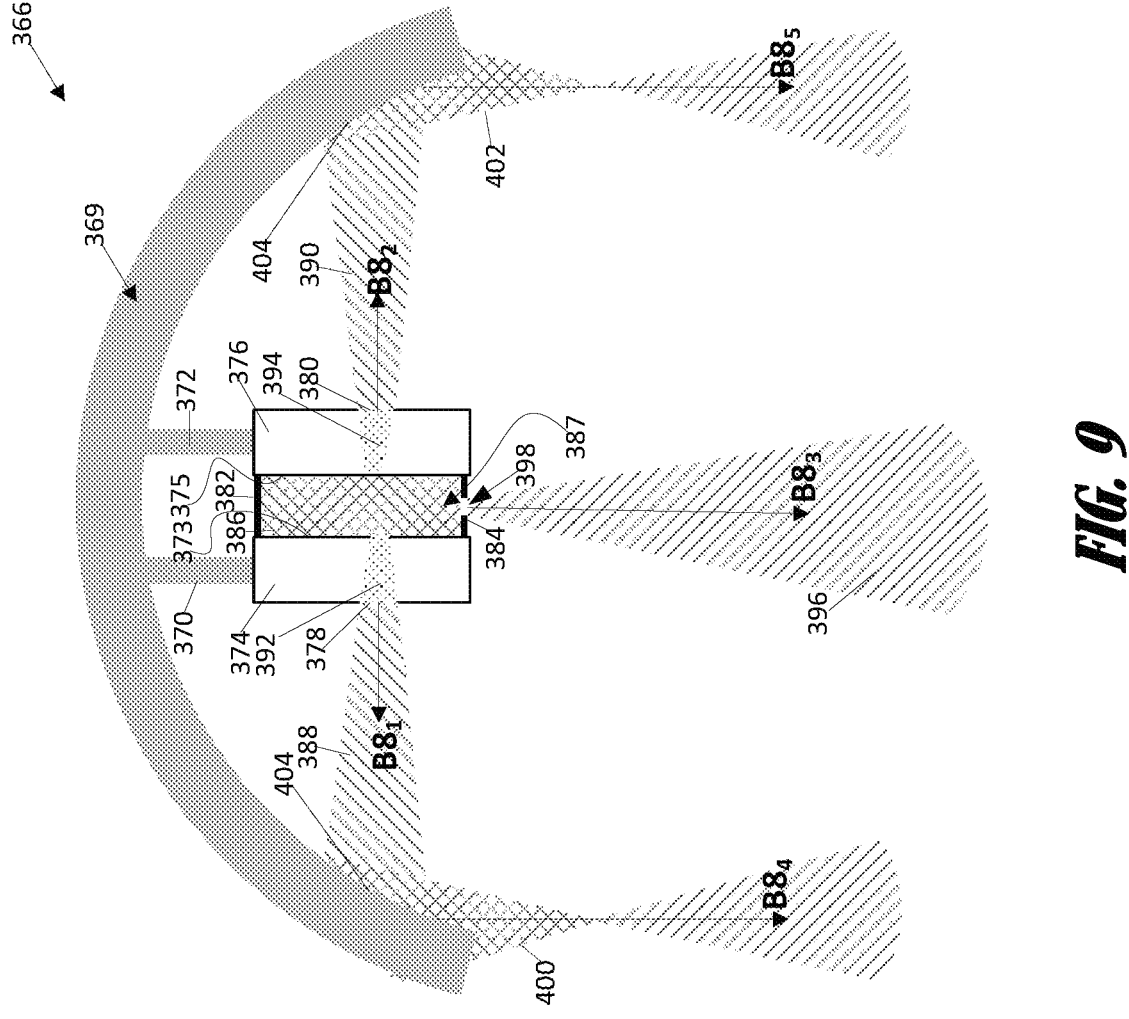
Figure 10:
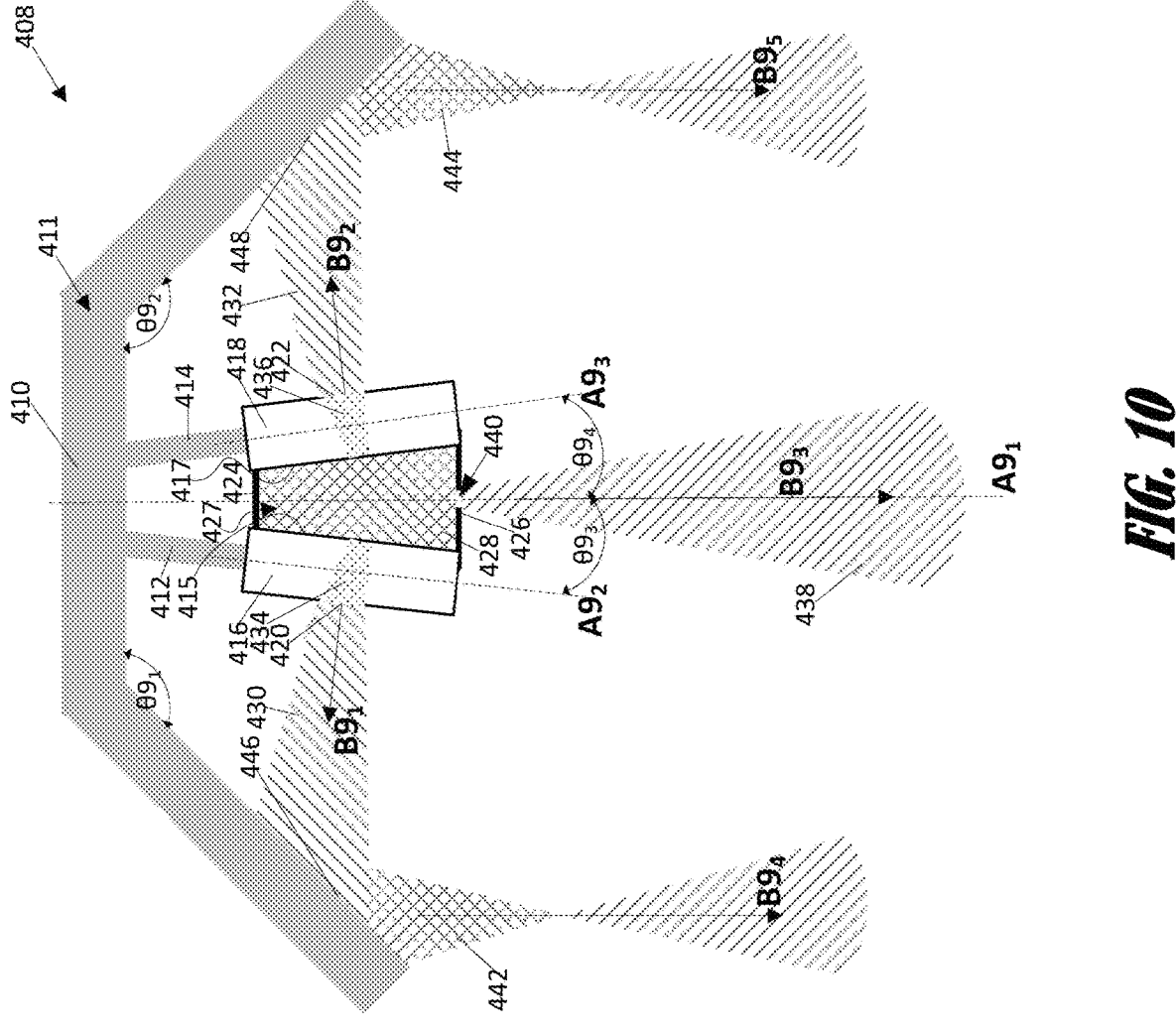
Figure 11:
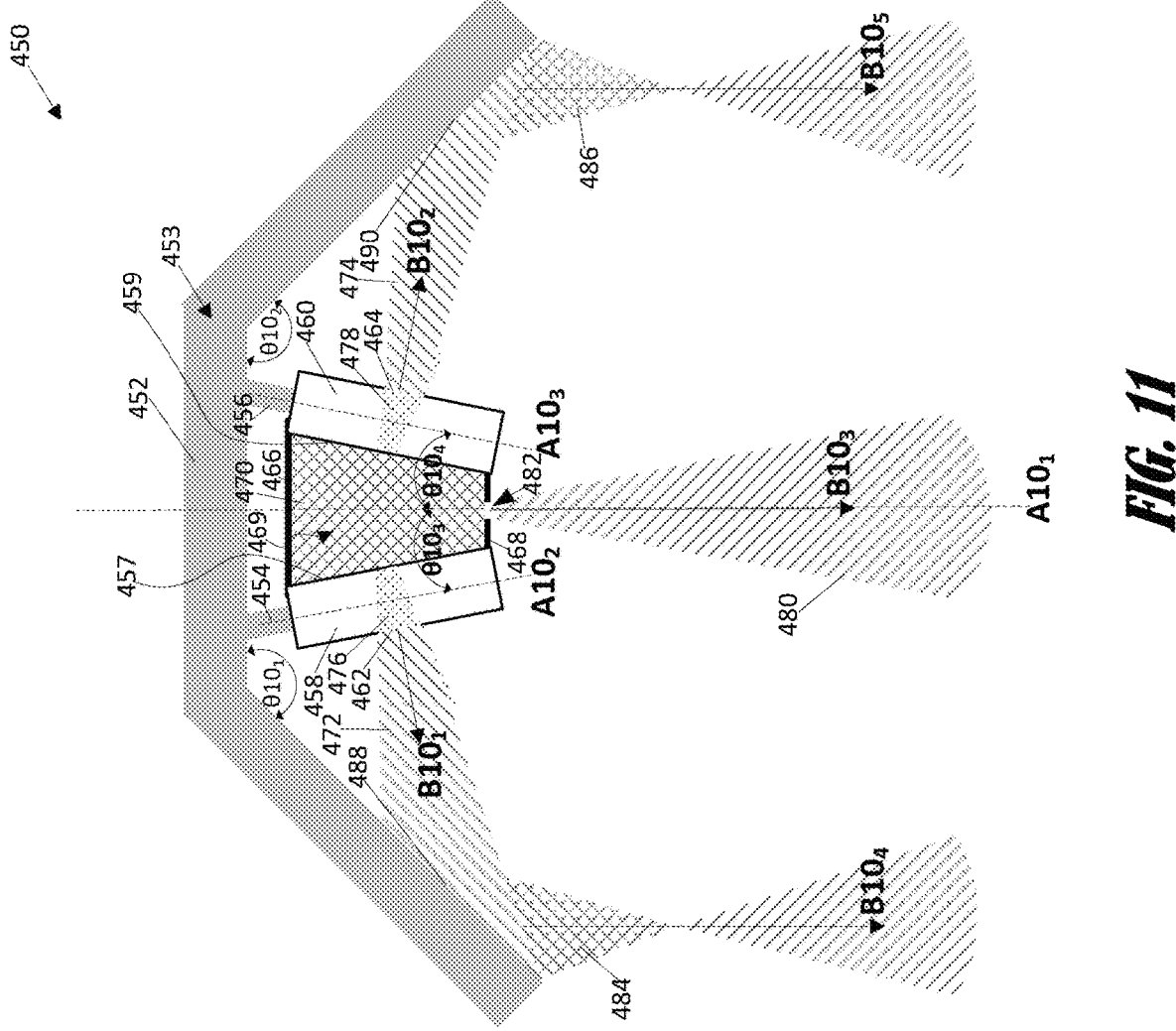
Figure 12:
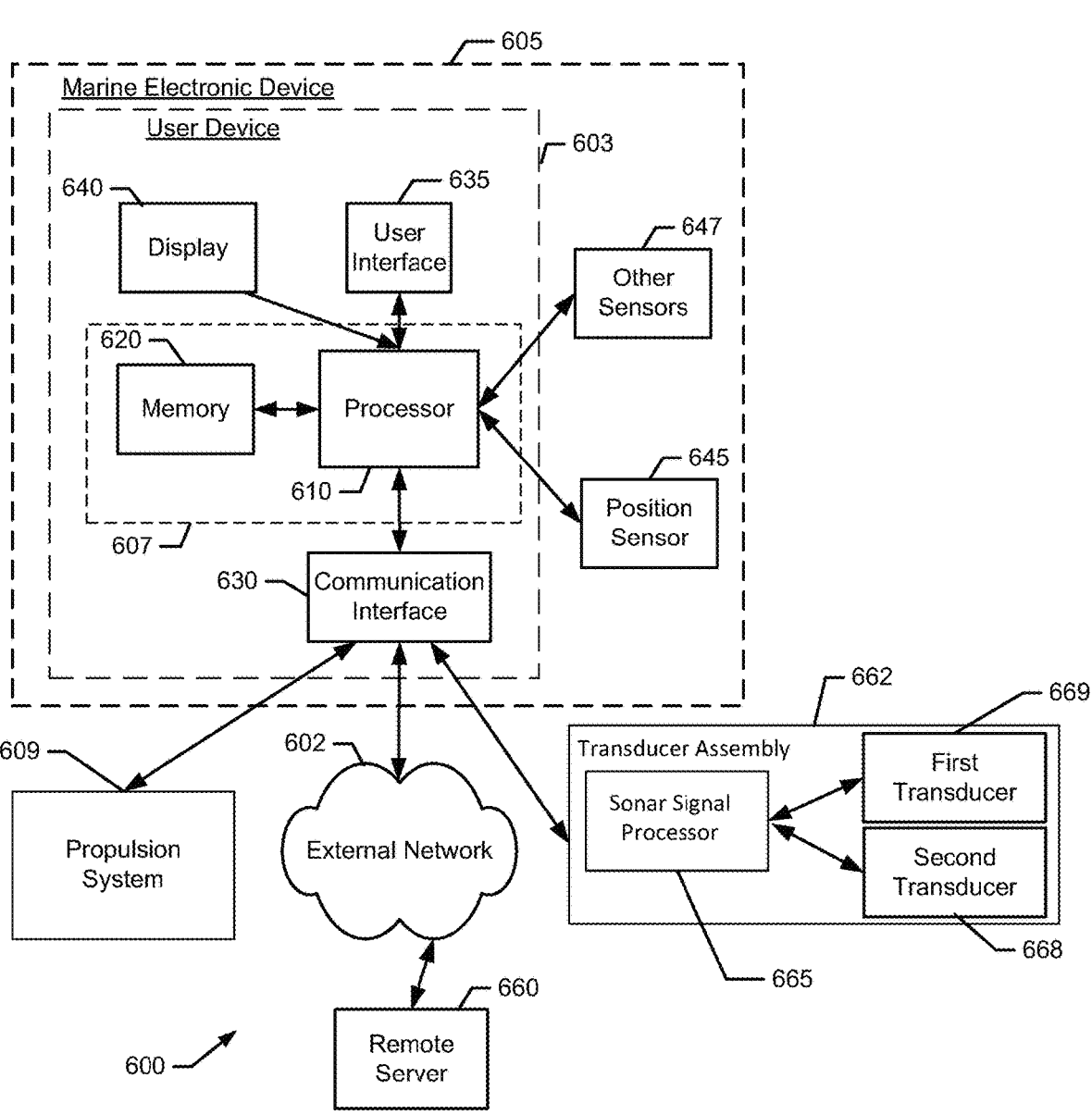
Figure 13:
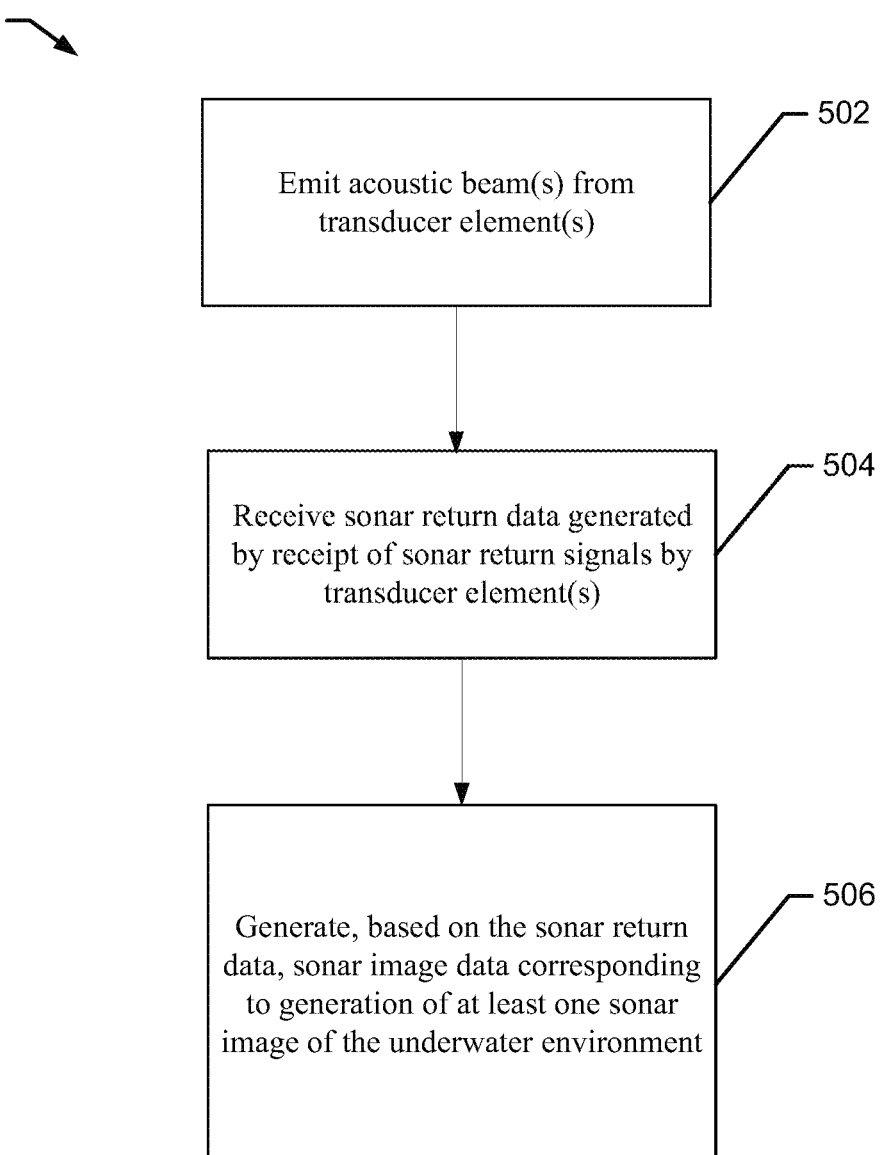

Having thus described the invention in general terms, reference will now be made to the accompanying drawings, which are not necessarily drawn to scale, and wherein:

FIG. 1 is a schematic side view of an example watercraft (e.g., vessel) including a sonar transducer assembly, in accordance with some embodiments discussed herein;

FIG. 2 is a schematic front view of an example transducer assembly, in accordance with some example embodiments discussed herein;

FIG. 3 is a schematic front view of another example transducer assembly with a beam reflector in accordance with some example embodiments discussed herein;

FIG. 4 is a schematic front view of another example transducer assembly with a curved beam reflector, in accordance with some example embodiments discussed herein;

FIG. 5 is a schematic front view of another example transducer assembly with a beam reflector, wherein a first transducer element and a second transducer element of the transducer assembly are positioned at angles with respect to a center axis, in accordance with some example embodiments discussed herein;

FIG. 6 is a schematic front view of another example transducer assembly with a beam reflector, wherein a first transducer element and a second transducer element of the transducer assembly are positioned at angles with respect to a center axis, in accordance with some example embodiments discussed herein;

FIG. 7 is a schematic front view of another example transducer assembly wherein a plurality of acoustic beams within a gap are configured to produce an additional acoustic beam through an opening, in accordance with some example embodiments discussed herein;

FIG. 8 is a schematic front view of another example transducer assembly with a beam reflector, wherein a plurality of acoustic beams within a gap are configured to produce an additional acoustic beam through an opening, in accordance with some example embodiments discussed herein;

FIG. 9 is a schematic front view of another example transducer assembly with a curved beam reflector wherein a plurality of acoustic beams within a gap are configured to produce an additional acoustic beam through an opening, in accordance with some example embodiments discussed herein;

FIG. 10 is a schematic front view of another example transducer assembly with a beam reflector, wherein a first transducer element and a second transducer element of the transducer assembly are positioned at angles with respect to a center axis, and wherein a plurality of acoustic beams within a gap are configured to produce an additional acoustic beam through an opening, in accordance with some example embodiments discussed herein;

FIG. 11 is a schematic front view of another example transducer assembly with a beam reflector, wherein a first transducer element and a second transducer element of the transducer assembly are positioned at angles with respect to a center axis, and wherein a plurality of acoustic beams within a gap are configured to produce an additional acoustic beam through an opening, in accordance with some example embodiments discussed herein;

FIG. 12 is a block diagram of an example marine electronic system in accordance with some example embodiments discussed herein; and FIG. 13 is a flowchart of an example method, in accordance with some example embodiments discussed herein.

DETAILED DESCRIPTION

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Further, either of the terms "or" and "one of _____ and _____," as used in this disclosure and the appended claims is intended to mean an inclusive "or" rather than an exclusive "or." That is, unless specified otherwise, or clear from the context, either of the phrases "X employs A or B" and "X employs one of A and B" is intended to mean any of the natural inclusive permutations. That is, either phrase is satisfied by any of the following instances: X employs A; X employs B; or X employs both A and B, regardless whether the phrases "at least one of A or B" or "at least one of A and B" are otherwise utilized in the specification or claims. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," or the like, as used herein does not necessarily refer to the same embodiment, although it may.

As depicted in FIG. 1, a watercraft, e.g., vessel 100, configured to traverse a marine environment, e.g., body of water 101, may use one or more sonar transducer assemblies 102a, 102b, and 102c disposed on and/or proximate to the vessel. The vessel 100 may be a surface watercraft, a submersible watercraft, or any other implementation known to those skilled in the art. The transducer assemblies 102a, 102b, and 102c may each include one or more transducer elements configured to transmit sound waves into a body of water, receive sonar return signals from the body of water, and convert the sonar return signals into sonar return data.

One or more sonar, or acoustic, beams may be generated by the one or more transducer assemblies 102a, 102b, and 102c when deployed in the body of water 101. In some instances, a plurality of transducer elements may be embodied in a transducer assembly. In some instances, the transducer assembly may include one or more of a right scanning (e.g., sidescan) element, a left scanning (e.g., sidescan) element, a conical downscan sonar element, and/or a bar (e.g., linear, elongated rectangle, or the like) downscan sonar element, which may be housed within a transducer housing. In some example embodiments, the transducer assembly may be or include a transducer array, e.g., a "phased array" or a "frequency-steered array." The transducer array may include a plurality of transducer elements arranged on a printed circuit board (PCB). The PCB may mechanically support and electrically connect the electronic components, including the transducer elements using conductive tracks (e.g., traces), pads, and other features. The conductive tracks may comprise sets of traces, for example, and each transducer element may be mounted to the PCB such that the transducer element is in electrical communication with a set of traces. Each transducer element, sub-array, and/or the array of transducer elements may be configured to transmit one or more sonar pulses and/or receive one or more sonar return signals.

The transducer arrays or individual transducer elements may transmit one or more sonar signals, e.g., acoustic beams, into a body of water with a transmit transducer, a transmit/receive transducer, or similar device. When the sound waves of the acoustic beams strike anything of differing acoustic impedance (e.g., the sea floor or something suspended in the water above the bottom), the acoustic waves reflect off that object. These echoes (or sonar return signals) may strike the transmitting transducer element and/or a separate one or more sonar receiver elements, which convert the echoes back into an electrical signal which is processed by a processor (e.g., processing circuitry 407 and/or a sonar signal processor 465 as discussed in reference to FIG. 12) and sent to a display (e.g., an LCD) mounted in the cabin or other convenient location in the watercraft. This process may be referred to as "sounding." Since the speed of sound in water may be determined by the properties of the water (approximately 4800 feet per second in fresh water), the time lapse between the transmitted signal and the received echoes can be measured and the distance to the objects determined. This process may repeat itself many times per second. The results of many soundings are used to build a picture on the display of the underwater environment, e.g., a sonar image.

In an example embodiment, a vessel 100 may include a main propulsion motor 105, such as an outboard or inboard motor. Additionally, the vessel 100 may include trolling motor 108 configured to propel the vessel 100 or maintain a position. The one or more transducer assemblies (e.g., 102a, 102b, and/or 102c) may be mounted in various positions and to various portions of the vessel 100 and/or equipment associated with the vessel 100. For example, the transducer assemblies may be mounted to the transom 106 of the vessel 100, such as depicted by transducer assembly 102a, may be mounted to the bottom or side of the hull 104 of the vessel 100, such as depicted by transducer assembly 102b, or may be mounted to the trolling motor 108, such as depicted by transducer assembly 102c.

Certain aspects of example sonar systems, including example configurations and geometries of transducer assemblies and resulting acoustic beams, are discussed with reference to FIGS. 2-11. When used herein, the terms "beam"

and "acoustic beam" may refer to a sound wave propagating in a well-defined direction, but they may also refer to a portion of a sound wave pattern wherein the portion propagates along a given direction (e.g., the beam may be defined by sound emanated in the 3 dB to −3 dB range, although other ranges are contemplated). Those of skill in the art will appreciate that dispersion of a beam may occur for various reasons, and thus the depictions of acoustic beams in the present disclosure are simplified for the purpose of illustration. Additionally, some example embodiments are described below in the context of sound waves emanating from a transducer element, and thus acoustic beams are depicted as propagating away from transducer elements. However, those of skill in the art will appreciate that, in accordance with the principle of reciprocity for waves, embodiments of the present invention are equally applicable to the reverse process of receiving acoustic waves.

Referring now to FIG. 2, a sonar system 110 in this embodiment may comprise a sonar signal processor, such as sonar signal processor 465 described herein. Although such a sonar signal processor is not shown in FIG. 2, it will be appreciated that suitable sonar signal processing circuitry may be disposed within or be remote from the sonar system 110 in various embodiments. As those of skill in the art will appreciate, the sonar system 110 may be mounted (e.g., via a mounting bracket) to a vessel in various locations. The result may be that, e.g., a first acoustic beam 130 and a fourth acoustic beam 132 may be used to form two separate sonar images, or they may be able to be used to form one combined sonar image of the underwater environment.

The sonar system 110 includes a first transducer element 116 mounted to a base element 111 through a first mounting element 112 and a second transducer element 118 mounted to the base element 111 through a second mounting element 114. Each of the first transducer element 116 and the second transducer element 118 may include a piezoelectric ceramic disc. The first transducer element 116 may have a first emitting face 120 and a second emitting face 117, and the second transducer element 118 may have a third emitting face 119 and a fourth emitting face 122. The first emitting face 120 may be disposed on an opposite side of the first transducer element 116 from the second emitting face 117, and the third emitting face 119 may be disposed on an opposite side of the second transducer element 118 from the fourth emitting face 122.

Although only two transducer elements are shown in this embodiment, those of skill in the art will appreciate that more than two transducer elements may be provided in other embodiments. The dimensions and relative positions of the first transducer element 116 and the second transducer element 118 may be selected by those of skill in the art based on the particular implementation and method used to generate acoustic beams.

Further, it should be appreciated that the first transducer element 116 and the second transducer element 118 are mounted to the base element 111 such that the first emitting face 120, the second emitting face 117, the third emitting face 119, and the fourth emitting face 122 are parallel with each other. As will be described herein, the first transducer element 116 and the second transducer element 118 may be mounted to the base element 111 in any other way (e.g., such that the first emitting face 120, the second emitting face 117, the third emitting face 119, and the fourth emitting face 122 are not parallel with each other). Further, in some embodiments, the sonar system 110 may not have a base element 111 at all.

The first transducer element 116 and the second transducer element 118 may be positioned such that a gap 127 is formed therebetween. The gap 127 may be enclosed by a first barrier 124 and a second barrier 126 and may include fluid therein. In some embodiments, the fluid enclosed in the gap 127 may be polyurethane. In other embodiments, however, the fluid may be any other fluid.

The sonar system 110 may be connected to the sonar signal processor that is in electronic communication with the first transducer element 116 and the second transducer element 118, and the sonar signal processor may be operative to cause transmission of signals from the first transducer element 116 and the second transducer element 118 to cause a first acoustic beam 130 to be emitted from the first emitting face 120 in a first beam direction $B1_1$ into the underwater environment and a fourth acoustic beam 132 to be emitted from the fourth emitting face 122 in a second beam direction $B1_2$ into the underwater environment. In the embodiment shown, a circumferential surface of the first transducer element 116 and a circumferential surface of the second transducer element 118 are configured with an attached and/or abutting first foam element and a second foam element, respectively, such that the first emitting face 120 and the fourth emitting face 122 focus the first acoustic beam 130 in the first beam direction $B1_1$ and the fourth acoustic beam 132 in the second beam direction $B1_2$, respectively. The first foam element and the second foam element also act to focus the second beam (emitted from the second emitting face 117) and the third beam (emitted from the third emitting face 119) so as to be directed into the gap 127. The first acoustic beam 130 and the fourth acoustic beam 132 shown in FIG. 2 are conical acoustic beams, but it should be appreciated that, in other embodiments, the first transducer element 116 and the second transducer element 118 may be configured such that the first acoustic beam 130 and the fourth acoustic beam 132 take on any other form.

In some embodiments, beam directions $B1_1$ and $B1_2$ may be parallel and/or collinear. In other embodiments, such as where one or more of the first and second transducer elements 116 and 118 are operative to generate one or more steerable acoustic beams, beam directions $B1_1$ and $B1_2$ may, at least at times, be disposed at an angle. Those of skill in the art are familiar with various methods for determining beam direction, which may differ depending on the manner in which acoustic beams 130 and 132 are generated. In some embodiments, acoustic beams 130 and 132 may be conical in shape, at least initially, though that is not required.

The sonar signal processor may also be operative to cause transmission of signals from the first transducer element 116 and the second transducer element 118 to cause second and third acoustic beams to be emitted from the second emitting face 117 and the third emitting face 119 into the gap 127. As will be described herein, the second and third acoustic beams emitted from the second emitting face 117 and the third emitting face 119 may be contained within the gap 127 such that a plurality of acoustic waves 128 fill the gap 127. In other words, the second and third acoustic beams that are emitted from the second emitting face 117 and the third emitting face 119 immediately combine together to form the plurality of acoustic waves 128 (instead of emanating out as beams, as do the first acoustic beam 130 and the fourth acoustic beam 132).

The gap 127 between the first transducer element 116 and the second transducer element 118 may be configured to facilitate movement of the fluid therein so as to contribute to an emission of sound power in both the first beam direction $B1_1$ and the second beam direction $B1_2$. For example, the emissions of sound power into the gap 127 from the second emitting face 117 and the third emitting face 119 may be contained within the gap 127 between the first barrier 124 and the second barrier 126 such that the plurality of acoustic waves 128 bounce back and forth within the gap 127. The back and forth bouncing of the plurality of acoustic waves 128 within the gap 127 between the first barrier 124, the second barrier 126, the second emitting face 117, and the third emitting face 119 may cause the fluid within the gap 127 to move, and the movement of the fluid in the gap 127 may cause a first transmission of energy 134 through the first transducer element 116 and a second transmission of energy 136 through the second transducer element 118. The first transmission of energy 134 may cause an amplification of the first acoustic beam 130 in the first beam direction $B1_1$, and the second transmission of energy 136 may cause an amplification of the fourth acoustic beam 132 in the second beam direction $B1_2$. For example, the first acoustic beam 130 and the fourth acoustic beam 132 may be wider, farther reaching, and/or more powerful than they would otherwise be without the first transmission of energy 134 and the second transmission of energy 136. Other amplification effects are also contemplated.

The sonar signal processor may be further configured to receive sonar return data generated by receipt of sonar return signals by the first transducer element 116 and/or the second transducer element 118, and then the sonar signal processor may generate, based on the sonar return data, sonar image data corresponding to generation of at least one sonar image of the underwater environment. The sonar image(s) that are generated may then be displayed on a screen of a marine electronic device.

In some example embodiments, one or both of the first transducer element 116 and/or the second transducer element 118 may be disc-shaped transducer element(s). In other words, one or both of the first transducer element 116 and/or the second transducer element 118 may be substantially cylindrical in shape in this embodiment. One or both of the first transducer element 116 and/or the second transducer element 118 may be piezoelectric crystalline structure(s) operative to emit acoustic beam(s) into a body of water via the conversion of electrical energy into vibrational energy, which is thereby transferred into the water surrounding transducer assembly 110. The first transducer element 116 may comprise first and second emitting faces 120 and 117 in this embodiment, each of which may be substantially circular in shape. Similarly, the second transducer element 118 may comprise third and fourth emitting faces 119 and 122 in this embodiment, each of which may be substantially circular in shape. A cylindrical body portion may extend between the emitting faces 120 and 117 and between the emitting faces 119 and 122. Although disc-shaped transducer elements 116 and 118 are depicted in FIG. 2, those of skill in the art should appreciate that embodiments of the present invention are not so limited, and in other example embodiments any suitable transducer elements 116 and 118 may be used. In some embodiments, for example, one or more linear transducer elements may be provided, either alone or in addition to one or more disc-shaped transducer elements.

According to various embodiments, all four of the emitting faces 120, 117, 119, and 122 of the first and second transducer elements 116 and 118 may be used to radiate acoustic energy. In that regard, in various embodiments, the first and second transducer elements 116 and 118 may be mounted in or on the base element 111 via the first mounting element 112 and the second mounting element 114. Thus, in other words, none of the emitting faces 120, 117, 119, and 122 may be used for mounting of the first or second transducer elements 116 and 118. As will be appreciated by those of skill in the art, and although not shown in FIG. 2, electrical connections may be made on the emitting faces 120, 117, 119, and 122 via solder or the like. In some embodiments, the electrical connections may be symmetric, and for example, solder may be deposited in approximately the same place on each of the emitting faces 120, 117, 119, and 122. In some embodiments, the electrical connections may be made where the least acceleration or movement of each of the emitting faces 120, 117, 119, and 122 will occur, such as at the center thereof (depending on the excitation mode). In the depicted embodiment, the first and second transducer elements 116 and 118 may be radial-mode elements.

As those of skill in the art will appreciate, in some implementations, it is possible for one electrode of a transducer element to be wrapped around the cylindrical surface to provide electrodes for each face that are accessible from only one of the faces. Doing so, however, may nullify some of the radiating surface of the piezoelectric crystal element. Specifically, the electric field generated in the crystal element no longer may be completely conformal with the polarization of the material, and as such, strain may not be induced in some of the material (on excitation), and some of the material may not contribute charge to the electrode surface when stressed (on receiving). Although embodiments are contemplated wherein such a transducer element configuration may be used, this implementation is not preferred in various embodiments. In general, for solid (not shells) piezoelectric transducer geometries, various embodiments will have electrodes on each face having opposite polarity so that the electric field generated by a pulse generator is directed through the thickness of the element.

In general, in various example embodiments, and depending on the mounting location and orientation of transducer assembly 110 and/or first and second transducer elements 116 and 118 with respect to a vessel, first and second beam directions $B1_1$ and $B1_2$ may be substantially parallel with the surface of the water on which the vessel operates. Correspondingly, in various example embodiments, where transducer assembly 110 is mounted on the side of the vessel, first and second beam directions $B1_1$ and $B1_2$ may extend in an alongship, or stern to bow, direction. In other example embodiments, such as where transducer assembly 110 is mounted on the transom of the vessel, first and second beam directions $B1_1$ and $B1_2$ may extend in an athwartship, or port to starboard, direction. In either case, emitting faces 120 and 122 may lie on or be tangent to a plane that is perpendicular with the surface of the water on which the vessel operates. In other words, emitting faces 120 and 122 may lie on or be tangent to a plane that extends in an up-down, or hull-to-deck direction. Of course, those of skill in the art will appreciate that in other embodiments, either or both of first and second beam directions $B1_1$ and $B1_2$ may be disposed at an angle relative to the horizontal or vertical, and thus may not be parallel with the surface of the water on which the vessel operates in some embodiments. Similarly, in various embodiments the first and second beam directions $B1_1$ and $B1_2$ may be disposed at an angle relative to the alongship centerline of the vessel or to the athwartship centerline of the vessel, and thus may not be parallel with either such centerline of the vessel in some embodiments. Again, first and second beam directions $B1_1$ and $B1_2$ may vary in position depending on the mounting position and intended use of transducer assembly 110.

Additional aspects of the geometry of various components of a transducer assembly in accordance with various embodiments, and the acoustic beam(s) employed thereby, are discussed with reference to FIG. 3, which is a schematic representation of a transducer assembly 138. Analogous to transducer assembly 110 described above, transducer assembly 138 may comprise a first transducer element 150 and a second transducer element 152. Notably, however, transducer assembly 138 also includes a beam reflector. The beam reflector includes first and second beam reflecting surfaces 142 and 144. The result may be that, e.g., a fifth acoustic beam 172 and a sixth acoustic beam 174 may be used to form two separate sonar images, or they may be able to be used to form one combined sonar image of the underwater environment.

Like the sonar system 110 of FIG. 2, the sonar system 138 includes a first transducer element 150 mounted to a base element 140 through a first mounting element 146 and a second transducer element 152 mounted to the base element 140 through a second mounting element 148. The first transducer element 150 may have a first emitting face 154 and a second emitting face 151, and the second transducer element 152 may have a third emitting face 153 and a fourth emitting face 156. Further, the first transducer element 150 and the second transducer element 152 may be positioned such that a gap 161 is formed therebetween. The gap 161 may be enclosed by a first barrier 158 and a second barrier 160 and may include fluid therein. In some embodiments, the fluid enclosed in the gap 161 may be polyurethane. In other embodiments, however, the fluid may be any other fluid. The sonar system 138 may be connected to the sonar signal processor that is in electronic communication with the first transducer element 150 and the second transducer element 152, and the sonar signal processor may be operative to cause transmission of signals from the first transducer element 150 and the second transducer element 152 to cause a first acoustic beam 164 to be emitted from the first emitting face 154 in a first beam direction $B2_1$ into the underwater environment and a fourth acoustic beam 166 to be emitted from the fourth emitting face 156 in a second beam direction $B2_2$ into the underwater environment.

The sonar signal processor may also be operative to cause transmission of signals from the first transducer element 150 and the second transducer element 152 to cause second and third acoustic beams to be emitted from the second emitting face 151 and the third emitting face 153 into the gap 161. The second and third acoustic beams emitted from the second emitting face 151 and the third emitting face 153 may be contained within the gap 161 such that a plurality of acoustic waves 162 fill the gap 161. In other words, the second and third acoustic beams that are emitted from the second emitting face 151 and the third emitting face 153 immediately combine together to form the plurality of acoustic waves 162 (instead of emanating out as beams, as do the first acoustic beam 164 and the fourth acoustic beam 166).

The gap 161 between the first transducer element 150 and the second transducer element 152 may be configured to facilitate movement of the fluid therein so as to contribute to an emission of sound power in both the first beam direction $B2_1$ and the second beam direction $B2_2$. For example, the emissions of sound power into the gap 161 from the second emitting face 151 and the third emitting face 153 may be contained within the gap 161 between the first barrier 158 and the second barrier 160 such that the plurality of acoustic waves 162 bounce back and forth within the gap 161. The back and forth bouncing of the plurality of acoustic waves 162 within the gap 161 between the first barrier 158, the second barrier 160, the second emitting face 151, and the third emitting face 153 may cause the fluid within the gap 161 to move, and the movement of the fluid in the gap 161 may cause a first transmission of energy 168 through the first transducer element 150 and a second transmission of energy 170 through the second transducer element 152. The first transmission of energy 168 may cause an amplification of the first acoustic beam 164 in the first beam direction $B2_1$, and the second transmission of energy 170 may cause an amplification of the fourth acoustic beam 166 in the second beam direction $B2_2$. For example, the first acoustic beam 164 and the fourth acoustic beam 166 may be wider, farther reaching, and/or more powerful than they would otherwise be without the first transmission of energy 168 and the second transmission of energy 170. Other amplification effects are also contemplated.

The sonar signal processor may be further configured to receive sonar return data generated by receipt of sonar return signals by the first transducer element 150 and/or the second transducer element 152, and then the sonar signal processor may generate, based on the sonar return data, sonar image data corresponding to generation of at least one sonar image of the underwater environment. The sonar image(s) that are generated may then be displayed on a screen of a marine electronic device.

Additionally, the sonar system 138 may include a beam reflector 141 having a first beam reflecting surface 142 and a second beam reflecting surface 144. In various embodiments, the beam reflector 141 may be utilized to redirect acoustic beam(s) emitted from the first transducer element 150 and/or the second transducer element 152 and, in some embodiments, to redirect return acoustic beam(s) toward the first transducer element 150 and/or the second transducer element 152. As described further below, the beam reflector 141 includes first and second beam reflecting surfaces 142 and 144 in this embodiment.

The base element 140 may be coupled to or integral with the beam reflector 141 in this embodiment, and thus the beam reflector 141 may be disposed in a fixed position relative to the first transducer element 150 and/or the second transducer element 152. However, this is not required in all embodiments. In some embodiments, the beam reflector 141 or portions thereof, such as first and second beam reflecting surfaces 142 and 144, may be adjustable in position or movable, e.g., manually or via a motor. Also, in some embodiments, the beam reflector 141 may not be directly coupled with the base element 140. Furthermore, the base element 140 is not required in all embodiments. Indeed, in some embodiments, the first transducer element 150, the second transducer element 152, and/or the beam reflector 141 may be disposed within a vessel hull, with or without the base element 140.

In the depicted embodiment, the first and second beam reflecting surfaces 142 and 144 may be generally flat, or planar, in shape. However, a beam reflecting surface in accordance with various embodiments may define a variety of shapes and may be curved in some embodiments, as will be described in more detail herein. For instance, in some embodiments, the first and second beam reflecting surfaces 142 and 144 may be convex or concave with respect to the emitting faces of the first transducer element 150 and the second transducer element 152, respectively. In general, in some embodiments, the first and second beam reflecting surfaces 142 and 144 may be surfaces that will not create undesirable diffusion of or destructive interference within the transmitted acoustic beam. In some embodiments herein, a beam reflecting surface may define a uniform cross-section along its length. Also, in some embodiments, a beam reflecting surface may have a uniform shape along the length of the beam reflector 141. However, in some embodiments, a beam reflector 141 may comprise more than one beam reflecting surface, each of which may have different shapes. As those of skill in the art will appreciate, a variety of configurations and geometries of transducer elements and beam reflectors are contemplated and within the scope of various embodiments of the invention. For instance, other sonar systems in accordance with some example embodiments may comprise more than one beam reflector 141 and one or multiple beam reflecting surfaces.

In various embodiments, the beam reflector 141, or at least the portion thereof that comprises the first and second beam reflecting surfaces 142 and 144, may be formed of any suitable material suitable to cause reflection of an acoustic beam. The material may be selected such that diffusion of an acoustic beam does not occur, or is minimized, as a result of the reflection. In various embodiments, the beam reflector 141 and/or the first and second beam reflecting surfaces 142 and 144 may each be a smooth reflector made from a homogeneous material, such that it presents a regular smooth geometric impedance discontinuity relative to the material bearing the incident wave. In some embodiments, the law of reflection may apply continuously over the surfaces 142 and 144, and the reflection coefficient at any location may be determined by the angle of incidence and the characteristic impedance of the material from which first and second beam reflecting surfaces 142 and 144 and/or the beam reflector 141 is made, which may be uniform throughout the structure. In some embodiments, the beam reflector 141 and/or the first and second beam reflecting surfaces 142 and 144 may be formed of a relatively soft, or compliant material. In some embodiments, the beam reflector 141 may be formed of a molded plastic material and the first and second beam reflecting surfaces 142 and 144 may be formed of a foam material, such as a urethane foam.

In various embodiments, the beam reflector 141 may be disposed relative to the first and second transducer elements 150 and 152 such that the first and second beam reflecting surfaces 142 and 144 are positioned along the beam directions $B2_1$ and $B2_2$, respectively. In FIG. 3, for example, beam reflecting surface 142 is positioned along first beam direction $B2_1$, and beam reflecting surface 144 is positioned along second beam direction $B2_2$. In other words, first beam direction $B2_1$ is defined such that acoustic beam 164 propagates in a direction that causes acoustic beam 164 to impinge upon beam reflecting surface 142, and second beam direction $B2_2$ is defined such that acoustic beam 166 propagates in a direction that causes acoustic beam 166 to impinge upon beam reflecting surface 144. Depending on the type of transducer elements 150 and 152 (or arrays) and the methods of beamforming used, software and/or suitable beamforming circuitry may be used to steer the beams 164 and 166 in such a direction, or in some cases, the desired first and second beam directions $B2_1$ and $B2_2$ may result from the orientation and geometry of the emitting faces 154 and 156 relative to beam reflector 141.

The first beam reflecting surface 142 is positioned along the first beam direction $B2_1$ such that, when the first acoustic beam 164 is emitted, the first acoustic beam 164 impinges upon the first beam reflecting surface 142 and is reflected in a third beam direction $B2_3$ that is different from the first beam direction $B2_1$. After impinging on and reflecting off of the first beam reflecting surface 142, the first acoustic beam 164 turns into a fifth acoustic beam 172. The fifth acoustic beam 172 may be pointed in a vertically downward direction, as shown in FIG. 3, but in other embodiments, the fifth acoustic beam 172 may point in any other direction. Similarly, the second beam reflecting surface 144 is positioned along the second beam direction $B2_2$ such that, when the fourth acoustic beam 166 is emitted, the fourth acoustic beam 166 impinges upon the second beam reflecting surface 144 and is reflected in a fourth beam direction $B2_4$ that is different from the second beam direction $B2_2$. After impinging on and reflecting off of the second beam reflecting surface 144, the fourth acoustic beam 166 turns into a sixth acoustic beam 174. The sixth acoustic beam 174 may be pointed in a vertically downward direction, as shown in FIG. 3, but in other embodiments, the sixth acoustic beam 174 may point in any other direction.

The first beam reflecting surface 142 may be positioned at a first angle $\theta2_1$ with respect to a horizontal axis, such as defined by the base element 140 in the embodiment depicted in FIG. 3. Similarly, the second beam reflecting surface 144 may be positioned at a second angle $\theta2_2$ with respect to the horizontal axis. It should be appreciated that the angles $\theta2_1$ and $\theta2_2$ may be any angle with respect to a horizontal axis, and the horizontal axis may not be defined by the base element 140 (e.g., the base element 140 may also be disposed at an angle with respect to the horizontal axis). The angles $\theta2_1$ and $\theta2_2$ may be configured such that desired orientations of the acoustic beams 172 and 174 are achieved after acoustic beams 164 and 166 reflect off of beam reflecting surfaces 142 and 144.

In some embodiments, the geometries of the system 138 may be configured such that sonar return signals returned from the underwater environment may be reflected off at least one of the first beam reflecting surface 142 or the second beam reflecting surface 144 prior to being received by the first transducer element 150 or the second transducer element 152.

In some embodiments, the beam reflector 141 may be positioned such that the beam reflecting surfaces 142 and 144 are close in proximity to the corresponding emitting faces 154 and 156 of the transducer elements 150 and 152. Notably, the acoustic beams 164 and 166 expand as they propagate outwardly from the emitting faces 154 and 156. In this regard, the beam reflector 141 can be positioned to redirect the acoustic beams 164 and 166 at points along the beam directions $B2_1$ and $B2_2$ where the acoustic beams 164 and 166 have minimal or limited expansion. In such a regard, the sizes of the beam reflecting surfaces 142 and 144 can be relatively small, but still redirect the entireties of the acoustic beams 164 and 166. This maintains low manufacturing costs and also enables maintaining a smaller footprint for the sonar system, which may be very beneficial in the embodiments where the beam reflector 141 and the transducer elements 150 and 152 are contained within the same housing. For example, the designed center points of impingement of the beam reflecting surfaces 142 and 144 can be positioned at pre-determined distances from the emitting faces 154 and 156 along the beam directions $B2_1$ and $B2_2$, where the distances are designed for close proximity (e.g., within 3 in., within 6 in., within 1 ft, within 2 ft., etc.). In this regard, the acoustic beams 164 and 166 may be redirected before significantly expanding.

In the case of reflection, those of skill in the art will appreciate that, in general, the wave front and phase of the wave front may change at the boundary when the acoustic beams 164 and 166 reflect off of the beam reflecting surfaces 142 and 144. In various embodiments, however, the phase may not vary along beam reflector 141 and/or beam reflecting surfaces 142 and 144. In some embodiments, beam reflecting surfaces 142 and 144 may be ideal reflectors, or as close as possible thereto, in that the reflection coefficient may be nearly perfectly real and have a magnitude close to 1 (either positive or negative). In any event, as described above, acoustic beam 164 may have the third beam direction $B2_3$ following impingement on beam reflecting surface 142, and acoustic beam 166 may have the fourth beam direction $B2_4$ following impingement on beam reflecting surface 144. In the embodiment shown, the first and second beam directions $B2_1$ and $B2_2$ are different from the third and fourth beam directions $B2_3$ and $B2_4$, respectively.

In this regard, due to the orientations of the first and second transducer elements 150 and 152 and beam reflector 141, the first and second beam directions $B2_1$ and $B2_2$ may be aimed in either an alongship or an athwartship direction, or at angles to either such direction, but may be substantially parallel with the surface of the water upon which the vessel operates. Upon reflection of acoustic beams 164 and 166, the third and fourth beam directions $B2_3$ and $B2_4$ may be in a substantially vertically downward direction, e.g., toward the seabed below the vessel. Of course, other configurations are contemplated and within the scope of the present invention. In some example embodiments, for instance, third and fourth beam directions $B2_3$ and $B2_4$ may be substantially lateral of the vessel, such that acoustic beams 172 and 174 are directed toward a side or sides of the vessel.

Beam reflectors in accordance with various embodiments preferably are positioned with respect to the transducer element(s) such that, following impingement upon and reflection off of the beam reflecting surface(s), the reflected portion of the acoustic beam(s) do not interfere with the transducer element(s). In other words, and for example, beam reflectors in accordance with various embodiments are preferably disposed at a distance from and orientation relative to the transducer element(s) that is sufficient to permit reflection of acoustic beam(s) that are transmitted from the transducer element(s) in a direction that does not cause the reflected acoustic beam(s) to impinge upon the transducer element(s) before they reach an interrogated object. In some embodiments, the beam reflector 141 and/or beam reflecting surface(s) may be disposed vertically above or below the face of the transducer element from which an acoustic beam emanates, and in some embodiments, the beam reflector 141 may be rotated or disposed at an angle relative to the orientation of the transducer element. Further, beam reflectors in accordance with various embodiments are preferably disposed at a distance from and orientation relative to the transducer element(s) that minimizes the size of the overall assembly or does not render it too large. In various embodiments, the region (e.g., between first and second transducer elements 150 and 152 and beam reflecting surfaces 142 and 144) in which the incident and reflected waves interact may not be less coherent or less well-defined, as long as the amplitude is small enough to remain linear.

As can be seen in FIG. 3, the relative geometries of the first and second transducer elements 150 and 152, beam reflector 141, and beam reflecting surfaces 142 and 144 are selected such that neither of the beam directions $B2_1$ or $B2_2$ cause any portion of the transmitted acoustic beams 164, 166, 172, or 174 to impinge upon either of the first or second transducer elements 150 and 152 before arriving at the object to be interrogated. In various embodiments, sonar systems such as sonar system 138 may be configured to be perfectly reciprocal, such that acoustic beams returning from an interrogated object will impinge upon the beam reflecting surfaces 142 and 144 and then be reflected toward the transducer element.

It should be appreciated that the first beam reflecting surface 142 and the second beam reflecting surface 144 may be formed from any material and may have any shape and/or surface profile. For example, the first beam reflecting surface 142 and the second beam reflecting surface 144 in FIG. 3 are formed of a foam material and are straight. However, in other embodiments, one or both of the first beam reflecting surface 142 and the second beam reflecting surface 144 may be made of any other material, may not be straight, and/or may be configured in any other way to achieve a desired imaging of the underwater environment.

Referring now to FIG. 4, a curved beam reflector 179 may be integrated together with a base element to form one curved beam reflecting surface 180 onto which a first transducer element 188 and a second transducer element 190 can be mounted. The result may be that, e.g., a fifth acoustic beam 210 and a sixth acoustic beam 212 may be used to form two separate sonar images, or they may be able to be used to form one combined sonar image of the underwater environment.

Like the previously described sonar assemblies, the sonar system 176 includes the first transducer element 188 mounted to the beam reflector 179 through a first mounting element 184 and the second transducer element 190 mounted to the beam reflector 179 through a second mounting element 186. The first transducer element 188 may have a first emitting face 192 and a second emitting face 187, and the second transducer element 190 may have a third emitting face 189 and a fourth emitting face 194. Further, the first transducer element 188 and the second transducer element 190 may be positioned such that a gap 199 is formed therebetween. The gap 199 may be enclosed by a first barrier 196 and a second barrier 198 and may include fluid therein. In some embodiments, the fluid enclosed in the gap 199 may be polyurethane. In other embodiments, however, the fluid may be any other fluid.

The sonar system 176 may be connected to the sonar signal processor that is in electronic communication with the first transducer element 188 and the second transducer element 190, and the sonar signal processor may be operative to cause transmission of signals from the first transducer element 188 and the second transducer element 190 to cause a first acoustic beam 202 to be emitted from the first emitting face 192 in a first beam direction $B3_1$ into the underwater environment and a fourth acoustic beam 204 to be emitted from the fourth emitting face 194 in a second beam direction $B3_2$ into the underwater environment.

The sonar signal processor may also be operative to cause transmission of signals from the first transducer element 188 and the second transducer element 190 to cause second and third acoustic beams to be emitted from the second emitting face 187 and the third emitting face 189 into the gap 199. The second and third acoustic beams emitted from the second emitting face 187 and the third emitting face 189 may be contained within the gap 199 such that a plurality of acoustic waves 200 fill the gap 199. In other words, the second and third acoustic beams that are emitted from the second emitting face 187 and the third emitting face 189 immediately combine together to form the plurality of acoustic waves 200 (instead of emanating out as beams, as do the first acoustic beam 202 and the fourth acoustic beam 204).

The gap 199 between the first transducer element 188 and the second transducer element 190 may be configured to facilitate movement of the fluid therein so as to contribute to an emission of sound power in both the first beam direction $B3_1$ and the second beam direction $B3_2$. For example, the emissions of sound power into the gap 199 from the second emitting face 187 and the third emitting face 189 may be contained within the gap 199 between the first barrier 196 and the second barrier 198 such that the plurality of acoustic waves 200 bounce back and forth within the gap 199. The back and forth bouncing of the plurality of acoustic waves 200 within the gap 199 between the first barrier 196, the second barrier 198, the second emitting face 187, and the third emitting face 189 may cause the fluid within the gap 199 to move, and the movement of the fluid in the gap 199 may cause a first transmission of energy 206 through the first transducer element 188 and a second transmission of energy 208 through the second transducer element 190. The first transmission of energy 206 may cause an amplification of the first acoustic beam 202 in the first beam direction $B3_1$, and the second transmission of energy 208 may cause an amplification of the fourth acoustic beam 204 in the second beam direction $B3_2$. For example, the first acoustic beam 202 and the fourth acoustic beam 204 may be wider, farther reaching, and/or more powerful than they would otherwise be without the first transmission of energy 206 and the second transmission of energy 208. Other amplification effects are also contemplated.

The sonar signal processor may be further configured to receive sonar return data generated by receipt of sonar return signals by the first transducer element 188 and/or the second transducer element 190, and then the sonar signal processor may generate, based on the sonar return data, sonar image data corresponding to generation of at least one sonar image of the underwater environment. The sonar image(s) that are generated may then be displayed on a screen of a marine electronic device.

Additionally, the sonar system 176 may include the beam reflector 179 having a beam reflecting surface 180. The beam reflector 179 may be similar to the beam reflector 141 of FIG. 3, except it may be curved. For example, in various embodiments, the beam reflector 179 may be utilized to redirect acoustic beam(s) emitted from the first transducer element 188 and/or the second transducer element 190 and, in some embodiments, to redirect return acoustic beam(s) toward the first transducer element 188 and/or the second transducer element 190.

In the depicted embodiment, the beam reflecting surface 180 is curved in shape. However, a beam reflecting surface in accordance with various embodiments may define a variety of shapes and may be generally flat or planar in some embodiments, as will be described in more detail herein. For instance, in some embodiments, the beam reflecting surface 180 may be convex or concave with respect to the emitting faces of the first transducer element 188 and the second transducer element 190, respectively. In general, in some embodiments, the beam reflecting surface 180 may be a surface that will not create undesirable diffusion of or destructive interference within the transmitted acoustic beam. In some embodiments herein, a beam reflecting surface may define a uniform cross-section along its length. Also, in some embodiments, a beam reflecting surface may have a uniform shape along the length of the beam reflector 179. However, in some embodiments, a beam reflector 179 may comprise more than one beam reflecting surface, each of which may have different shapes. As those of skill in the art will appreciate, a variety of configurations and geometries of transducer elements and beam reflectors are contemplated and within the scope of various embodiments of the invention. For instance, other sonar systems in accordance with some example embodiments may comprise more than one beam reflector 179 and one or multiple beam reflecting surfaces.

Similar to beam reflector 141 of FIG. 3, the beam reflector 179 of FIG. 4 may be disposed relative to the first and second transducer elements 188 and 190 such that portions of the beam reflecting surface 180 are positioned along the beam directions $B3_1$ and $B3_2$, respectively. The beam reflecting surface 180 is positioned along the first beam direction $B3_1$ such that, when the first acoustic beam 202 is emitted, the first acoustic beam 202 impinges upon the beam reflecting surface 180 and is reflected in a third beam direction $B3_3$ that is different from the first beam direction $B3_1$. After impinging on and reflecting off of the beam reflecting surface 180, the first acoustic beam 202 turns into a fifth acoustic beam 210. Similarly, the beam reflecting surface 180 is positioned along the second beam direction $B3_2$ such that, when the fourth acoustic beam 204 is emitted, the fourth acoustic beam 204 impinges upon the beam reflecting surface 180 and is reflected in a fourth beam direction $B3_4$ that is different from the second beam direction $B3_2$. After impinging on and reflecting off of the beam reflecting surface 180, the fourth acoustic beam 204 turns into a sixth acoustic beam 212.

The beam reflecting surface 180 may have any radius of curvature. For example, in some embodiments, some portions of the beam reflecting surface 180 may have different radii of curvature than other portions of the beam reflecting surface 180, or in other embodiments, the entire beam reflecting surface 180 may have the same radius of curvature. The beam reflecting surface 180 may be configured such that desired orientations of the acoustic beams 210 and 212 are achieved after acoustic beams 202 and 204 reflect off of beam reflecting surfaces 180 and 180.

Referring now to FIG. 5, a first transducer element 226 and a second transducer element 224 may be positioned at angles with respect to a vertical plane. Analogous to transducer assembly 138 described above, transducer assembly 214 may comprise the first transducer element 226, the second transducer element 228, and a beam reflector 217. Unlike transducer assembly 138, however, the first and second transducer elements 226 and 228 of transducer assembly 214 are angled with respect to vertical axis $A4_1$. The result may be that, e.g., a fifth acoustic beam 248 and a sixth acoustic beam 250 may be used to form two separate sonar images, or they may be able to be used to form one combined sonar image of the underwater environment.

Like the previously described sonar assemblies, the sonar system 214 includes a first transducer element 226 mounted to a base element 216 through a first mounting element 222 and a second transducer element 228 mounted to the base element 216 through a second mounting element 224. The first transducer element 226 may have a first emitting face 230 and a second emitting face 225, and the second transducer element 228 may have a third emitting face 227 and a fourth emitting face 232.

As shown in FIG. 5, a central axis $A4_2$ of the first transducer element 226 is positioned at a first angle $\theta4_3$ with respect to the vertical axis $A4_1$, and a central axis $A4_3$ of the second transducer element 228 is positioned at a second angle $\theta4_4$ with respect to the vertical axis $A4_1$. The first transducer element 226 and the second transducer element 228 in FIG. 5 are angled such that portions of the first transducer element 226 and the second transducer element 228 which are closer to the base element 216 are closer together and such that portions of the first transducer element 226 and the second transducer element 228 which are farther from the base element 216 are farther apart. It should be appreciated that the vertical axis $A4_1$ may, in some embodiments, further define a vertical plane from which the first transducer element 226 and the second transducer element 227 are angled. In some embodiments, the first angle $\theta4_3$ and the second angle $\theta4_4$ may be approximately 5 degrees, but in other embodiments, the first angle $\theta4_3$ and the second angle $\theta4_4$ may be any other angle values.

The first transducer element 226 and the second transducer element 228 may be positioned such that a gap 237 is formed therebetween. The gap 237 may be enclosed by a first barrier 234 and a second barrier 236 and may include fluid therein. In some embodiments, the fluid enclosed in the gap 237 may be polyurethane. In other embodiments, however, the fluid may be any other fluid.

The sonar system 214 may be connected to the sonar signal processor that is in electronic communication with the first transducer element 226 and the second transducer element 228, and the sonar signal processor may be operative to cause transmission of signals from the first transducer element 226 and the second transducer element 228 to cause a first acoustic beam 240 to be emitted from the first emitting face 230 in a first beam direction $B4_1$ into the underwater environment and a fourth acoustic beam 242 to be emitted from the fourth emitting face 232 in a second beam direction $B4_2$ into the underwater environment.

The sonar signal processor may also be operative to cause transmission of signals from the first transducer element 226 and the second transducer element 228 to cause second and third acoustic beams to be emitted from the second emitting face 225 and the third emitting face 227 into the gap 237. The second and third acoustic beams emitted from the second emitting face 225 and the third emitting face 227 may be contained within the gap 237 such that a plurality of acoustic waves 238 fill the gap 237. In other words, the second and third acoustic beams that are emitted from the second emitting face 225 and the third emitting face 227 immediately combine together to form the plurality of acoustic waves 238 (instead of emanating out as beams, as do the first acoustic beam 240 and the fourth acoustic beam 242).

The gap 237 between the first transducer element 226 and the second transducer element 228 may be configured to facilitate movement of the fluid therein so as to contribute to an emission of sound power in both the first beam direction $B4_1$ and the second beam direction $B4_2$. For example, the emissions of sound power into the gap 237 from the second emitting face 225 and the third emitting face 227 may be contained within the gap 237 between the first barrier 234 and the second barrier 236 such that the plurality of acoustic waves 238 bounce back and forth within the gap 237. The back and forth bouncing of the plurality of acoustic waves 238 within the gap 237 between the first barrier 234, the second barrier 236, the second emitting face 225, and the third emitting face 227 may cause the fluid within the gap 237 to move, and the movement of the fluid in the gap 237 may cause a first transmission of energy 244 through the first transducer element 226 and a second transmission of energy 246 through the second transducer element 228. The first transmission of energy 244 may cause an amplification of the first acoustic beam 240 in the first beam direction $B4_1$, and the second transmission of energy 246 may cause an amplification of the fourth acoustic beam 242 in the second beam direction $B4_2$. For example, the first acoustic beam 240 and the fourth acoustic beam 242 may be wider, farther reaching, and/or more powerful than they would otherwise be without the first transmission of energy 244 and the second transmission of energy 246. Other amplification effects are also contemplated.

The sonar signal processor may be further configured to receive sonar return data generated by receipt of sonar return signals by the first transducer element 226 and/or the second transducer element 228, and then the sonar signal processor may generate, based on the sonar return data, sonar image data corresponding to generation of at least one sonar image of the underwater environment. The sonar image(s) that are generated may then be displayed on a screen of a marine electronic device.

Additionally, the sonar system 214 may include the beam reflector 217 having a first beam reflecting surface 218 and a second beam reflecting surface 220. The beam reflector 217 may be similar to the beam reflector 141 of FIG. 3. For example, in various embodiments, the beam reflector 217 may be utilized to redirect acoustic beam(s) emitted from the first transducer element 226 and/or the second transducer element 228 and, in some embodiments, to redirect return acoustic beam(s) toward the first transducer element 226 and/or the second transducer element 228.

Like the beam reflector 141 of FIG. 3, the beam reflector 217 of FIG. 5 may be disposed relative to the first and second transducer elements 226 and 228 such that the first and second beam reflecting surfaces 218 and 220 are positioned along the beam directions $B4_1$ and $B4_2$, respectively. The first beam reflecting surface 218 is positioned along the first beam direction $B4_1$ such that, when the first acoustic beam 240 is emitted, the first acoustic beam 240 impinges upon the first beam reflecting surface 218 and is reflected in a third beam direction $B4_3$ that is different from the first beam direction $B4_1$. After impinging on and reflecting off of the first beam reflecting surface 218, the first acoustic beam 240 turns into a fifth acoustic beam 248. Similarly, the second beam reflecting surface 220 is positioned along the second beam direction $B4_2$ such that, when the fourth acoustic beam 242 is emitted, the fourth acoustic beam 242 impinges upon the second beam reflecting surface 220 and is reflected in a fourth beam direction $B4_4$ that is different from the second beam direction $B4_2$. After impinging on and reflecting off of the second beam reflecting surface 220, the fourth acoustic beam 242 turns into a sixth acoustic beam 250.

The first beam reflecting surface 218 may be positioned at a first angle 641 with respect to a horizontal axis and/or plane, such as defined by the base element 216 in the embodiment depicted in FIG. 5. Similarly, the second beam reflecting surface 220 may be positioned at a second angle $\theta4_2$ with respect to the horizontal axis and/or plane. It should be appreciated that the angles $\theta4_1$ and $\theta4_2$ may be any angle with respect to a horizontal axis and/or plane, and the horizontal axis and/or plane may not be defined by the base element 216 (e.g., the base element 216 may also be disposed at an angle with respect to the horizontal axis and/or plane). The angles $\theta4_1$ and $\theta4_2$ may be configured such that desired orientations of the acoustic beams 248 and 250 are achieved after acoustic beams 240 and 242 reflect off of beam reflecting surfaces 218 and 220. For example, the angles $\theta4_1$ and $\theta4_2$ may be configured such that the first and second angles $\theta4_3$ and $\theta4_4$ of the first and second transducer elements 226 and 228 correspond to angles $\theta4_1$ and $\theta4_2$ in such a way so as to achieve desired patterns of the acoustic beams 240, 242, 248, and 250. In some embodiments, the angles $\theta4_1$ and $\theta4_2$ may be approximately 45 degrees, but in other embodiments, the angles $\theta4_1$ and $\theta4_2$ may be any other angle values.

Referring now to FIG. 6, a first transducer element 264 and a second transducer element 262 may be positioned at different angles with respect to a vertical plane. Analogous to transducer assembly 214 described above, transducer assembly 252 may comprise the first transducer element 264, the second transducer element 266, and a beam reflector 255. Unlike transducer assembly 214, however, the first and second transducer elements 264 and 266 of transducer assembly 252 are angled differently with respect to vertical axis $A5_1$. The result may be that, e.g., a fifth acoustic beam 286 and a sixth acoustic beam 288 may be used to form two separate sonar images, or they may be able to be used to form one combined sonar image of the underwater environment.

Like the previously described sonar assemblies, the sonar system 252 includes a first transducer element 264 mounted to a base element 254 through a first mounting element 260 and a second transducer element 266 mounted to the base element 254 through a second mounting element 262. The first transducer element 264 may have a first emitting face 268 and a second emitting face 263, and the second transducer element 266 may have a third emitting face 265 and a fourth emitting face 270.

As shown in FIG. 6, a central axis $A5_2$ of the first transducer element 264 is positioned at a first angle $\theta5_3$ with respect to the vertical axis $A5_1$, and a central axis $A5_3$ of the second transducer element 266 is positioned at a second angle $\theta5_4$ with respect to the vertical axis $A5_1$. The first transducer element 264 and the second transducer element 266 in FIG. 6 are angled such that portions of the first transducer element 264 and the second transducer element 266 which are closer to the base element 254 are farther apart and such that portions of the first transducer element 264 and the second transducer element 266 which are farther from the base element 254 are closer together. It should be appreciated that the vertical axis $A5_1$ may, in some embodiments, further define a vertical plane from which the first transducer element 264 and the second transducer element 265 are angled. In some embodiments, the first angle $\theta5_3$ and the second angle $\theta5_4$ may be approximately 5 degrees, but in other embodiments, the first angle $\theta5_3$ and the second angle $\theta5_4$ may be any other angle values.

The first transducer element 264 and the second transducer element 266 may be positioned such that a gap 275 is formed therebetween. The gap 275 may be enclosed by a first barrier 272 and a second barrier 274 and may include fluid therein. In some embodiments, the fluid enclosed in the gap 275 may be polyurethane. In other embodiments, however, the fluid may be any other fluid.

The sonar system 252 may be connected to the sonar signal processor that is in electronic communication with the first transducer element 264 and the second transducer element 266, and the sonar signal processor may be operative to cause transmission of signals from the first transducer element 264 and the second transducer element 266 to cause a first acoustic beam 278 to be emitted from the first emitting face 268 in a first beam direction $B5_1$ into the underwater environment and a fourth acoustic beam 280 to be emitted from the fourth emitting face 270 in a second beam direction $B5_2$ into the underwater environment.

The sonar signal processor may also be operative to cause transmission of signals from the first transducer element 264 and the second transducer element 266 to cause second and third acoustic beams to be emitted from the second emitting face 263 and the third emitting face 265 into the gap 275. The second and third acoustic beams emitted from the second emitting face 263 and the third emitting face 265 may be contained within the gap 275 such that a plurality of acoustic waves 276 fill the gap 275. In other words, the second and third acoustic beams that are emitted from the second emitting face 263 and the third emitting face 265 immediately combine together to form the plurality of acoustic waves 276 (instead of emanating out as beams, as do the first acoustic beam 278 and the fourth acoustic beam 280).

The gap 275 between the first transducer element 264 and the second transducer element 266 may be configured to facilitate movement of the fluid therein so as to contribute to an emission of sound power in both the first beam direction $B5_1$ and the second beam direction $B5_2$. For example, the emissions of sound power into the gap 275 from the second emitting face 263 and the third emitting face 265 may be contained within the gap 275 between the first barrier 272 and the second barrier 274 such that the plurality of acoustic waves 276 bounce back and forth within the gap 275. The back and forth bouncing of the plurality of acoustic waves 276 within the gap 275 between the first barrier 272, the second barrier 274, the second emitting face 263, and the third emitting face 265 may cause the fluid within the gap 275 to move, and the movement of the fluid in the gap 275 may cause a first transmission of energy 282 through the first transducer element 264 and a second transmission of energy 284 through the second transducer element 266. The first transmission of energy 282 may cause an amplification of the first acoustic beam 278 in the first beam direction $B5_1$, and the second transmission of energy 284 may cause an amplification of the fourth acoustic beam 280 in the second beam direction $B5_2$. For example, the first acoustic beam 278 and the fourth acoustic beam 280 may be wider, farther reaching, and/or more powerful than they would otherwise be without the first transmission of energy 282 and the second transmission of energy 284. Other amplification effects are also contemplated.

The sonar signal processor may be further configured to receive sonar return data generated by receipt of sonar return signals by the first transducer element 264 and/or the second transducer element 266, and then the sonar signal processor may generate, based on the sonar return data, sonar image data corresponding to generation of at least one sonar image of the underwater environment. The sonar image(s) that are generated may then be displayed on a screen of a marine electronic device.

Additionally, the sonar system 252 may include the beam reflector 255 having a first beam reflecting surface 256 and a second beam reflecting surface 258. The beam reflector 255 may be similar to the beam reflector 141 of FIG. 3. For example, in various embodiments, the beam reflector 255 may be utilized to redirect acoustic beam(s) emitted from the first transducer element 264 and/or the second transducer element 266 and, in some embodiments, to redirect return acoustic beam(s) toward the first transducer element 264 and/or the second transducer element 266.

Like the beam reflector 141 of FIG. 3, the beam reflector 255 of FIG. 6 may be disposed relative to the first and second transducer elements 264 and 266 such that the first and second beam reflecting surfaces 256 and 258 are positioned along the beam directions $B5_1$ and $B5_2$, respectively. The first beam reflecting surface 256 is positioned along the first beam direction $B5_1$ such that, when the first acoustic beam 278 is emitted, the first acoustic beam 278 impinges upon the first beam reflecting surface 256 and is reflected in a third beam direction $B5_3$ that is different from the first beam direction $B5_1$. After impinging on and reflecting off of the first beam reflecting surface 256, the first acoustic beam 278 turns into a fifth acoustic beam 286. Similarly, the second beam reflecting surface 258 is positioned along the second beam direction $B5_2$ such that, when the fourth acoustic beam 280 is emitted, the fourth acoustic beam 280 impinges upon the second beam reflecting surface 258 and is reflected in a fourth beam direction $B5_4$ that is different from the second beam direction $B5_2$. After impinging on and reflecting off of the second beam reflecting surface 258, the fourth acoustic beam 280 turns into a sixth acoustic beam 288.

The first beam reflecting surface 256 may be positioned at a first angle $\theta5_1$ with respect to a horizontal axis and/or plane, such as defined by the base element 254 in the embodiment depicted in FIG. 6. Similarly, the second beam reflecting surface 258 may be positioned at a second angle $\theta5_2$ with respect to the horizontal axis and/or plane. It should be appreciated that the angles $\theta5_1$ and $\theta5_2$ may be any angle with respect to a horizontal axis and/or plane, and the horizontal axis and/or plane may not be defined by the base element 254 (e.g., the base element 254 may also be disposed at an angle with respect to the horizontal axis and/or plane). The angles $\theta5_1$ and $\theta5_2$ may be configured such that desired orientations of the acoustic beams 286 and 288 are achieved after acoustic beams 278 and 280 reflect off of beam reflecting surfaces 256 and 258. For example, the angles $\theta5_1$ and $\theta5_2$ may be configured such that the first and second angles $\theta5_3$ and $\theta5_4$ of the first and second transducer elements 264 and 266 correspond to angles $\theta5_1$ and $\theta5_2$ in such a way so as to achieve desired patterns of the first acoustic beam 278, the fourth acoustic beam 280, the fifth acoustic beam 286, and the sixth acoustic beam 288. In some embodiments, the angles $\theta5_1$ and $\theta5_2$ may be approximately 45 degrees, but in other embodiments, the angles $\theta5_1$ and $\theta5_2$ may be any other angle values.

Example Embodiments for Creation of Additional Acoustic Beam(s) from the Gap Referring now to FIG. 7, an opening 322 may be incorporated into a second barrier 308 such that a fifth acoustic beam 320 is formed in a third beam direction $B6_3$ from a gap 309 between a first transducer element 298 and a second transducer element 300. The result may be that, e.g., a first acoustic beam 312, a fourth acoustic beam 314, and the fifth acoustic beam 320 may be used to form three separate sonar images, two sonar images (one that is combined of two of the beams and a second that is just the third beam), or they may be able to be used to form one combined sonar image of the underwater environment.

Like the previously described sonar systems, sonar system 290 includes the first transducer element 298 mounted to a base element 292 through a first mounting element 294 and the second transducer element 300 mounted to the base element 292 through a second mounting element 296. The first transducer element 298 may have a first emitting face 302 and a second emitting face 297, and the second transducer element 300 may have a third emitting face 299 and a fourth emitting face 304. Further, the first transducer element 298 and the second transducer element 300 may be positioned such that the gap 309 is formed therebetween. The gap 309 may be at least partially enclosed by a first barrier 306 and the second barrier 308 and may include fluid therein. In some embodiments, the fluid within the gap 309 may be polyurethane. In other embodiments, however, the fluid may be any other fluid.

The sonar system 290 may be connected to the sonar signal processor that is in electronic communication with the first transducer element 298 and the second transducer element 300, and the sonar signal processor may be operative to cause transmission of signals from the first transducer element 298 and the second transducer element 300 to cause a first acoustic beam 312 to be emitted from the first emitting face 302 in a first beam direction $B6_1$ into the underwater environment and a fourth acoustic beam 314 to be emitted from the fourth emitting face 304 in a second beam direction $B6_2$ into the underwater environment.

The sonar signal processor may also be operative to cause transmission of signals from the first transducer element 298 and the second transducer element 300 to cause second and third acoustic beams to be emitted from the second emitting face 297 and the third emitting face 299 into the gap 309. As described herein, the second and third acoustic beams emitted from the second emitting face 297 and the third emitting face 299 may be contained within the gap 309 such that a plurality of acoustic waves 310 fill the gap 309. In other words, the second and third acoustic beams that are emitted from the second emitting face 297 and the third emitting face 299 immediately combine together to form the plurality of acoustic waves 310.

The gap 309 between the first transducer element 298 and the second transducer element 300 may be configured to facilitate movement of the fluid therein so as to contribute to an emission of sound power in both the first beam direction $B6_1$ and the second beam direction $B6_2$. For example, the emissions of sound power into the gap 309 from the second emitting face 297 and the third emitting face 299 may be at least partially contained within the gap 309 between the first barrier 306 and the second barrier 308 such that the plurality of acoustic waves 310 bounce back and forth within the gap 309. The back and forth bouncing of the plurality of acoustic waves 310 within the gap 309 between the first barrier 306, the second barrier 308, the second emitting face 297, and the third emitting face 299 may cause the fluid within the gap 309 to move, and the movement of the fluid in the gap 309 may cause a first transmission of energy 316 through the first transducer element 298 and a second transmission of energy 318 through the second transducer element 300. The first transmission of energy 316 may cause an amplification of the first acoustic beam 312 in the first beam direction $B6_1$, and the second transmission of energy 318 may cause an amplification of the fourth acoustic beam 314 in the second beam direction $B6_2$. For example, the first acoustic beam 312 and the fourth acoustic beam 314 may be wider, farther reaching, and/or more powerful than they would otherwise be without the first transmission of energy 316 and the second transmission of energy 318. Other amplification effects are also contemplated.

As shown in FIG. 7, the second barrier 308 may further include an opening 322 configured to direct the fifth acoustic beam 320 in the third beam direction $B6_3$ from the gap 309. The opening 322 may be configured such that, when the second acoustic beam and the third acoustic beam are emitted from the emitting faces 297 and 299 into the gap 309, the second acoustic beam and the third acoustic beam are directed into an at least partially enclosed area formed by the gap 309 and then are directed out of the at least partially enclosed area in the third beam direction $B6_3$. Although the creation of the fifth acoustic beam 320 by the opening 322 may use some of the energy from the plurality of acoustic waves 310 within the gap 309, the plurality of acoustic waves 310 may still cause amplification of the first and fourth acoustic beams 312 and 314.

It should be appreciated that the opening 322 may have any configuration so as to create the fifth acoustic beam 320 having any shape. For example, the opening 322 depicted in FIG. 7 is configured such that the fifth acoustic beam 320 has a conical shape, but other configurations are contemplated. In this regard, in some embodiments, one or more horns, reflective surfaces, refractive structures, or other beam shaping or redirecting devices may be employed inside the gap 309 and/or in conjunction with the opening 322 to direct and/or shape the fifth acoustic beam 320.

The sonar signal processor may be further configured to receive sonar return data generated by receipt of sonar return signals by the first transducer element 298 and/or the second transducer element 300, and then the sonar signal processor may generate, based on the sonar return data, sonar image data corresponding to generation of at least one sonar image of the underwater environment. The sonar image(s) that are generated may then be displayed on a screen of a marine electronic device.

Referring now to FIG. 8, a sonar system 324 may include an opening 356 incorporated into a second barrier 342 such that a fifth acoustic beam 354 is formed in a third beam direction $B7_3$ from a gap 343 between a first transducer element 332 and a second transducer element 334. The sonar system may also include a first beam reflecting surface 362 and a second beam reflecting surface 364 such that the fifth acoustic beam 354, a sixth acoustic beam 358, and a seventh acoustic beam 360 all point in a generally downward direction. The fifth acoustic beam 354, the sixth acoustic beam 358, and the seventh acoustic beam 360 may be used to form three separate sonar images, or they may be able to be used to form one combined sonar image of the underwater environment.

Like some of the other sonar systems disclosed herein, sonar system 324 includes the first transducer element 332 mounted to a base element 326 through a first mounting element 328 and the second transducer element 334 mounted to the base element 326 through a second mounting element 330. The first transducer element 332 may have a first emitting face 336 and a second emitting face 331, and the second transducer element 334 may have a third emitting face 333 and a fourth emitting face 338. Further, the first transducer element 332 and the second transducer element 334 may be positioned such that the gap 343 is formed therebetween. The gap 343 may be at least partially enclosed by a first barrier 340 and the second barrier 342 and may include fluid therein. In some embodiments, the fluid within the gap 343 may be polyurethane. In other embodiments, however, the fluid may be any other fluid.

The sonar system 324 may be connected to the sonar signal processor that is in electronic communication with the first transducer element 332 and the second transducer element 334, and the sonar signal processor may be operative to cause transmission of signals from the first transducer element 332 and the second transducer element 334 to cause a first acoustic beam 346 to be emitted from the first emitting face 336 in a first beam direction $B7_1$ into the underwater environment and a fourth acoustic beam 348 to be emitted from the fourth emitting face 338 in a second beam direction $B7_2$ into the underwater environment.

The sonar signal processor may also be operative to cause transmission of signals from the first transducer element 332 and the second transducer element 334 to cause second and third acoustic beams to be emitted from the second emitting face 331 and the third emitting face 333 into the gap 343. As described herein, the second and third acoustic beams emitted from the second emitting face 331 and the third emitting face 333 may be contained within the gap 343 such that a plurality of acoustic waves 344 fill the gap 343. In other words, the second and third acoustic beams that are emitted from the second emitting face 331 and the third emitting face 333 immediately combine together to form the plurality of acoustic waves 344.

The gap 343 between the first transducer element 332 and the second transducer element 334 may be configured to facilitate movement of the fluid therein so as to contribute to an emission of sound power in both the first beam direction $B7_1$ and the second beam direction $B7_2$. For example, the emissions of sound power into the gap 343 from the second emitting face 331 and the third emitting face 333 may be at least partially contained within the gap 343 between the first barrier 340 and the second barrier 342 such that the plurality of acoustic waves 344 bounce back and forth within the gap 343. The back and forth bouncing of the plurality of acoustic waves 344 within the gap 343 between the first barrier 340, the second barrier 342, the second emitting face 331, and the third emitting face 333 may cause the fluid within the gap 343 to move, and the movement of the fluid in the gap 343 may cause a first transmission of energy 350 through the first transducer element 332 and a second transmission of energy 352 through the second transducer element 334. The first transmission of energy 350 may cause an amplification of the first acoustic beam 346 in the first beam direction $B7_1$, and the second transmission of energy 352 may cause an amplification of the fourth acoustic beam 348 in the second beam direction $B7_2$. For example, the first acoustic beam 346 and the fourth acoustic beam 348 may be wider, farther reaching, and/or more powerful than they would otherwise be without the first transmission of energy 350 and the second transmission of energy 352. Other amplification effects are also contemplated.

In some embodiments, the second barrier 342 may further include an opening 356 configured to direct the fifth acoustic beam 354 in the third beam direction $B7_3$ from the gap 343. The opening 356 may be configured such that, when the second acoustic beam and the third acoustic beam are emitted from the emitting faces 331 and 333 into the gap 343, the second acoustic beam and the third acoustic beam are directed into an at least partially enclosed area formed by the gap 343 and then are directed out of the at least partially enclosed area in the third beam direction $B7_3$.

The sonar signal processor may be further configured to receive sonar return data generated by receipt of sonar return signals by the first transducer element 332 and/or the second transducer element 334, and then the sonar signal processor may generate, based on the sonar return data, sonar image data corresponding to generation of at least one sonar image of the underwater environment. The sonar image(s) that are generated may then be displayed on a screen of a marine electronic device.

Additionally, the sonar system 324 may include a beam reflector 327 having a first beam reflecting surface 362 and a second beam reflecting surface 364. The beam reflector 327 may be similar to the beam reflector 141 of FIG. 3. In various embodiments, the beam reflector 327 may be utilized to redirect acoustic beam(s) emitted from the first transducer element 332 and/or the second transducer element 334 and, in some embodiments, to redirect return acoustic beam(s) toward the first transducer element 332 and/or the second transducer element 334.

Like the beam reflector 141 of FIG. 3, the beam reflector 327 may be disposed relative to the first and second transducer elements 332 and 334 such that the first and second beam reflecting surfaces 362 and 364 are positioned along the beam directions $B7_1$ and $B7_2$, respectively. The first beam reflecting surface 362 is positioned along the first beam direction $B7_1$ such that, when the first acoustic beam 346 is emitted, the first acoustic beam 346 impinges upon the first beam reflecting surface 362 and is reflected in a fourth beam direction $B7_4$ that is different from the first beam direction $B7_1$. After impinging on and reflecting off of the first beam reflecting surface 362, the first acoustic beam 346 turns into a sixth acoustic beam 358. Similarly, the second beam reflecting surface 364 is positioned along the second beam direction $B7_2$ such that, when the fourth acoustic beam 348 is emitted, the fourth acoustic beam 348 impinges upon the second beam reflecting surface 364 and is reflected in a fifth beam direction $B7_5$ that is different from the second beam direction $B7_2$. After impinging on and reflecting off of the second beam reflecting surface 364, the fourth acoustic beam 348 turns into a seventh acoustic beam 360.

The first beam reflecting surface 362 may be positioned at a first angle $\theta7_1$ with respect to a horizontal axis, such as defined by the base element 326 in the embodiment depicted in FIG. 8. Similarly, the second beam reflecting surface 364 may be positioned at a second angle $\theta7_2$ with respect to the horizontal axis. It should be appreciated that the angles $\theta7_1$ and $\theta7_2$ may be any angle with respect to a horizontal axis, and the horizontal axis may not be defined by the base element 326 (e.g., the base element 326 may also be disposed at an angle with respect to the horizontal axis). The angles $\theta7_1$ and $\theta7_2$ may be configured such that desired orientations of the acoustic beams 358 and 360 are achieved after acoustic beams 346 and 348 reflect off of beam reflecting surfaces 362 and 364.

It should be appreciated that, although the first and second beam reflecting surfaces 362 and 364 shown in FIG. 8 are configured to reflect acoustic beams 346 and 348 into acoustic beams 358 and 360, in some other embodiments, the beam reflector 327 may be modified so that acoustic beam 354 is reflected as well.

Referring now to FIG. 9, a sonar system 366 may include an opening 398 incorporated into a second barrier 384 such that a fifth acoustic beam 396 is formed in a third beam direction $B8_3$ from a gap 387 between a first transducer element 374 and a second transducer element 376. The sonar system may also include a curved beam reflector 369 integrated together with a base element to form one curved beam reflecting surface 404 onto which the first transducer element 374 and the second transducer element 376 can be mounted. The fifth acoustic beam 396, a sixth acoustic beam 400, and a seventh acoustic beam 402 may be formed by the sonar system 366 and may all point in a generally downward direction. The fifth acoustic beam 396, the sixth acoustic beam 400, and the seventh acoustic beam 402 may be used to form three separate sonar images, or they may be able to be used to form one combined sonar image of the underwater environment.

Like the previously described sonar assemblies, the sonar system 366 includes the first transducer element 374 mounted to a beam reflector 369 through a first mounting element 370 and the second transducer element 376 mounted to the beam reflector 369 through a second mounting element 372. The first transducer element 374 may have a first emitting face 378 and a second emitting face 373, and the second transducer element 376 may have a third emitting face 375 and a fourth emitting face 380.

The first transducer element 374 and the second transducer element 376 may be positioned such that the gap 387 is formed therebetween. The gap 387 may be at least partially enclosed by a first barrier 382 and the second barrier 384 and may include fluid therein. In some embodiments, the fluid within the gap 387 may be polyurethane. In other embodiments, however, the fluid may be any other fluid.

The sonar system 366 may be connected to the sonar signal processor that is in electronic communication with the first transducer element 374 and the second transducer element 376, and the sonar signal processor may be operative to cause transmission of signals from the first transducer element 374 and the second transducer element 376 to cause a first acoustic beam 388 to be emitted from the first emitting face 378 in a first beam direction B8$_1$ into the underwater environment and a fourth acoustic beam 390 to be emitted from the fourth emitting face 380 in a second beam direction B8$_2$ into the underwater environment.

The sonar signal processor may also be operative to cause transmission of signals from the first transducer element 374 and the second transducer element 376 to cause second and third acoustic beams to be emitted from the second emitting face 373 and the third emitting face 375 into the gap 387. As described herein, the second and third acoustic beams emitted from the second emitting face 373 and the third emitting face 375 may be contained within the gap 387 such that a plurality of acoustic waves 386 fill the gap 387. In other words, the second and third acoustic beams that are emitted from the second emitting face 373 and the third emitting face 375 immediately combine together to form the plurality of acoustic waves 386.

The gap 387 between the first transducer element 374 and the second transducer element 376 may be configured to facilitate movement of the fluid therein so as to contribute to an emission of sound power in both the first beam direction B8$_1$ and the second beam direction B8$_2$. For example, the emissions of sound power into the gap 387 from the second emitting face 373 and the third emitting face 375 may be at least partially contained within the gap 387 between the first barrier 382 and the second barrier 384 such that the plurality of acoustic waves 386 bounce back and forth within the gap 387. The back and forth bouncing of the plurality of acoustic waves 386 within the gap 387 between the first barrier 382, the second barrier 384, the second emitting face 373, and the third emitting face 375 may cause the fluid within the gap 387 to move, and the movement of the fluid in the gap 387 may cause a first transmission of energy 392 through the first transducer element 374 and a second transmission of energy 394 through the second transducer element 376. The first transmission of energy 392 may cause an amplification of the first acoustic beam 388 in the first beam direction B8$_1$, and the second transmission of energy 394 may cause an amplification of the fourth acoustic beam 390 in the second beam direction B8$_2$. For example, the first acoustic beam 388 and the fourth acoustic beam 390 may be wider, farther reaching, and/or more powerful than they would otherwise be without the first transmission of energy 392 and the second transmission of energy 394. Other amplification effects are also contemplated.

In some embodiments, the second barrier 384 may further include an opening 398 configured to direct the fifth acoustic beam 396 in the third beam direction B8$_3$ from the gap 387. The opening 398 may be configured such that, when the second acoustic beam and the third acoustic beam are emitted from the emitting faces 373 and 375 into the gap 387, the second acoustic beam and the third acoustic beam are directed into an at least partially enclosed area formed by the gap 387 and then are directed out of the at least partially enclosed area in the third beam direction B8$_3$.

The sonar signal processor may be further configured to receive sonar return data generated by receipt of sonar return signals by the first transducer element 374 and/or the second transducer element 376, and then the sonar signal processor may generate, based on the sonar return data, sonar image data corresponding to generation of at least one sonar image of the underwater environment. The sonar image(s) that are generated may then be displayed on a screen of a marine electronic device.

Additionally, the sonar system 366 may include the beam reflector 369 having the curved beam reflecting surface 404. The beam reflector 369 may be similar to the beam reflector 179 of FIG. 4. For example, in various embodiments, the beam reflector 369 may be utilized to redirect acoustic beam(s) emitted from the first transducer element 374 and/or the second transducer element 376 and, in some embodiments, to redirect return acoustic beam(s) toward the first transducer element 374 and/or the second transducer element 376. As described further below, the beam reflector 369 includes beam reflecting surface 404 in this embodiment.

In the depicted embodiment, the beam reflecting surface 404 is curved in shape. However, a beam reflecting surface in accordance with various embodiments may define a variety of shapes and may be generally flat or planar in some embodiments, as will be described in more detail herein. For instance, in some embodiments, the beam reflecting surface 404 may be convex or concave with respect to the emitting faces of the first transducer element 374 and the second transducer element 376, respectively. In general, in some embodiments, the beam reflecting surface 404 may be surfaces that will not create undesirable diffusion of or destructive interference within the transmitted acoustic beam. In some embodiments herein, a beam reflecting surface may define a uniform cross-section along its length. Also, in some embodiments, a beam reflecting surface may have a uniform shape along the length of the beam reflector 369. However, in some embodiments, a beam reflector 369 may comprise more than one beam reflecting surface, each of which may have different shapes. As those of skill in the art will appreciate, a variety of configurations and geometries of transducer elements and beam reflectors are contemplated and within the scope of various embodiments of the invention. For instance, other sonar systems in accordance with some example embodiments may comprise more than one beam reflector 369 and one or multiple beam reflecting surfaces.

Like beam reflector 179 of FIG. 4, the beam reflector 369 of FIG. 9 may be disposed relative to the first and second transducer elements 374 and 376 such that the beam reflecting surface 404 is positioned along the beam directions B8$_1$ and B8$_2$, respectively. The beam reflecting surface 404 is positioned along the first beam direction B8$_1$ such that, when the first acoustic beam 388 is emitted, the first acoustic beam 388 impinges upon the beam reflecting surface 404 and is reflected in a fourth beam direction B8$_4$ that is different from the first beam direction B8$_1$. After impinging on and reflecting off of the beam reflecting surface 404, the first acoustic beam 388 turns into a sixth acoustic beam 400. Similarly, the beam reflecting surface 404 is positioned along the second beam direction B8$_2$ such that, when the fourth acoustic beam 390 is emitted, the fourth acoustic beam 390 impinges upon the beam reflecting surface 404 and is reflected in a fifth beam direction B8$_5$ that is different from the second beam direction B8$_2$. After impinging on and reflecting off of the beam reflecting surface 404, the fourth acoustic beam 390 turns into a seventh acoustic beam 402.

It should be appreciated that, although the beam reflecting surface 404 shown in FIG. 9 is configured to reflect acoustic beams 388 and 390 into acoustic beams 400 and 402, in some other embodiments, the beam reflector 369 may be modified so that acoustic beam 396 is reflected as well.

Referring now to FIG. 10, a first transducer element 416 and a second transducer element 418 may be positioned at angles with respect to a vertical plane. Analogous to sonar system 324 described above, sonar system 408 may comprise the first transducer element 416, the second transducer element 418, and a beam reflector 411. Unlike transducer assembly 324, however, the first and second transducer elements 416 and 418 of transducer assembly 408 are angled with respect to vertical axis $A9_1$. The result may be that, e.g., a fifth acoustic beam 438, a sixth acoustic beam 442, and a seventh acoustic beam 444 may be used to form three separate sonar images, or they may be able to be used to form combined sonar image(s) of the underwater environment.

Like the previously described systems, sonar system 408 includes the first transducer element 416 mounted to a base element 410 through a first mounting element 412 and the second transducer element 418 mounted to the base element 410 through a second mounting element 414. The first transducer element 416 may have a first emitting face 420 and a second emitting face 415, and the second transducer element 418 may have a third emitting face 417 and a fourth emitting face 422.

As shown in FIG. 10, a central axis $A9_2$ of the first transducer element 416 is positioned at a first angle $\theta9_3$ with respect to the vertical axis $A9_1$, and a central axis $A9_3$ of the second transducer element 418 is positioned at a second angle $\theta9_4$ with respect to the vertical axis $A9_1$. The first transducer element 416 and the second transducer element 418 in FIG. 10 are angled such that portions of the first transducer element 416 and the second transducer element 418 which are closer to the base element 410 are closer together and such that portions of the first transducer element 416 and the second transducer element 418 which are farther from the base element 410 are farther apart. It should be appreciated that the vertical axis $A9_1$ may, in some embodiments, further define a vertical plane from which the first transducer element 416 and the second transducer element 418 are angled. In some embodiments, the first angle $\theta9_3$ and the second angle $\theta9_4$ may be approximately 5 degrees, but in other embodiments, the first angle $\theta9_3$ and the second angle $\theta9_4$ may be any other angle values.

The first transducer element 416 and the second transducer element 418 may be positioned such that the gap 427 is formed therebetween. The gap 427 may be at least partially enclosed by a first barrier 424 and the second barrier 426 and may include fluid therein. In some embodiments, the fluid within the gap 427 may be polyurethane. In other embodiments, however, the fluid may be any other fluid.

The sonar system 408 may be connected to the sonar signal processor that is in electronic communication with the first transducer element 416 and the second transducer element 418, and the sonar signal processor may be operative to cause transmission of signals from the first transducer element 416 and the second transducer element 418 to cause a first acoustic beam 430 to be emitted from the first emitting face 420 in a first beam direction $B9_1$ into the underwater environment and a fourth acoustic beam 432 to be emitted from the fourth emitting face 422 in a second beam direction $B9_2$ into the underwater environment.

The sonar signal processor may also be operative to cause transmission of signals from the first transducer element 416 and the second transducer element 418 to cause second and third acoustic beams to be emitted from the second emitting face 415 and the third emitting face 417 into the gap 427. As described herein, the second and third acoustic beams emitted from the second emitting face 415 and the third emitting face 417 may be contained within the gap 427 such that a plurality of acoustic waves 428 fill the gap 427. In other words, the second and third acoustic beams that are emitted from the second emitting face 415 and the third emitting face 417 immediately combine together to form the plurality of acoustic waves 428.

The gap 427 between the first transducer element 416 and the second transducer element 418 may be configured to facilitate movement of the fluid therein so as to contribute to an emission of sound power in both the first beam direction $B9_1$ and the second beam direction $B9_2$. For example, the emissions of sound power into the gap 427 from the second emitting face 415 and the third emitting face 417 may be at least partially contained within the gap 427 between the first barrier 424 and the second barrier 426 such that the plurality of acoustic waves 428 bounce back and forth within the gap 427. The back and forth bouncing of the plurality of acoustic waves 428 within the gap 427 between the first barrier 424, the second barrier 426, the second emitting face 415, and the third emitting face 417 may cause the fluid within the gap 427 to move, and the movement of the fluid in the gap 427 may cause a first transmission of energy 434 through the first transducer element 416 and a second transmission of energy 436 through the second transducer element 418. The first transmission of energy 434 may cause an amplification of the first acoustic beam 430 in the first beam direction $B9_1$, and the second transmission of energy 436 may cause an amplification of the fourth acoustic beam 432 in the second beam direction $B9_2$. For example, the first acoustic beam 430 and the fourth acoustic beam 432 may be wider, farther reaching, and/or more powerful than they would otherwise be without the first transmission of energy 434 and the second transmission of energy 436. Other amplification effects are also contemplated.

In some embodiments, the second barrier 426 may further include an opening 440 configured to direct the fifth acoustic beam 438 in the third beam direction $B9_3$ from the gap 427. The opening 440 may be configured such that, when the second acoustic beam and the third acoustic beam are emitted from the emitting faces 415 and 417 into the gap 427, the second acoustic beam and the third acoustic beam are directed into an at least partially enclosed area formed by the gap 427 and then are directed out of the at least partially enclosed area in the third beam direction $B9_3$.

The sonar signal processor may be further configured to receive sonar return data generated by receipt of sonar return signals by the first transducer element 416 and/or the second transducer element 418, and then the sonar signal processor may generate, based on the sonar return data, sonar image data corresponding to generation of at least one sonar image of the underwater environment. The sonar image(s) that are generated may then be displayed on a screen of a marine electronic device.

Additionally, the sonar system 408 may include a beam reflector 411 having a first beam reflecting surface 446 and a second beam reflecting surface 448. The beam reflector 411 may be similar to the beam reflector 141 of FIG. 3. In various embodiments, the beam reflector 411 may be utilized to redirect acoustic beam(s) emitted from the first transducer element 416 and/or the second transducer element 418 and, in some embodiments, to redirect return acoustic beam(s) toward the first transducer element 416 and/or the second transducer element 418.

Like the beam reflector 141 of FIG. 3, the beam reflector 411 of FIG. 10 may be disposed relative to the first and second transducer elements 416 and 418 such that the first and second beam reflecting surfaces 446 and 448 are positioned along the beam directions $B9_1$ and $B9_2$, respectively. The first beam reflecting surface 446 is positioned along the first beam direction $B9_1$ such that, when the first acoustic beam 430 is emitted, the first acoustic beam 430 impinges upon the first beam reflecting surface 446 and is reflected in a fourth beam direction $B9_4$ that is different from the first beam direction $B9_1$. After impinging on and reflecting off of the first beam reflecting surface 446, the first acoustic beam 430 turns into a sixth acoustic beam 442. Similarly, the second beam reflecting surface 448 is positioned along the second beam direction $B9_2$ such that, when the fourth acoustic beam 432 is emitted, the fourth acoustic beam 432 impinges upon the second beam reflecting surface 448 and is reflected in a fifth beam direction $B9_5$ that is different from the second beam direction $B9_2$. After impinging on and reflecting off of the second beam reflecting surface 448, the fourth acoustic beam 432 turns into a seventh acoustic beam 444.

The first beam reflecting surface 446 may be positioned at a first angle $\theta9_1$ with respect to a horizontal axis and/or plane, such as defined by the base element 410 in the embodiment depicted in FIG. 10. Similarly, the second beam reflecting surface 448 may be positioned at a second angle $\theta9_2$ with respect to the horizontal axis and/or plane. It should be appreciated that the angles $\theta9_1$ and $\theta9_2$ may be any angle with respect to a horizontal axis and/or plane, and the horizontal axis and/or plane may not be defined by the base element 410 (e.g., the base element 410 may also be disposed at an angle with respect to the horizontal axis and/or plane). The angles $\theta9_1$ and $\theta9_2$ may be configured such that desired orientations of the acoustic beams 442 and 444 are achieved after acoustic beams 430 and 432 reflect off of beam reflecting surfaces 446 and 448. For example, the angles $\theta9_1$ and $\theta9_2$ may be configured such that the first and second angles $\theta9_3$ and $\theta9_4$ of the first and second transducer elements 416 and 418 correspond to angles $\theta9_1$ and $\theta9_2$ in such a way so as to achieve desired patterns of the acoustic beams 430, 432, 442, and 444. In some embodiments, the angles $\theta9_1$ and $\theta9_2$ may be approximately 45 degrees, but in other embodiments, the angles $\theta9_1$ and $\theta9_2$ may be any other angle values.

It should be appreciated that, although the first and second beam reflecting surfaces 446 and 448 shown in FIG. 10 are configured to reflect acoustic beams 430 and 432 into acoustic beams 442 and 444, in some other embodiments, the beam reflector 411 may be modified so that acoustic beam 438 is reflected as well.

Referring now to FIG. 11, a first transducer element 458 and a second transducer element 460 may be positioned at angles with respect to a vertical plane. Analogous to sonar system 324 described above, sonar system 450 may comprise the first transducer element 458, the second transducer element 460, and a beam reflector 453. Unlike transducer assembly 324, however, the first and second transducer elements 458 and 460 of transducer assembly 450 are angled differently with respect to vertical axis $A10_1$. The result may be that, e.g., a fifth acoustic beam 480, a sixth acoustic beam 484, and a seventh acoustic beam 486 may be used to form three separate sonar images, or they may be able to be used to form combined sonar image(s) of the underwater environment.

Like the previously described systems, sonar system 450 includes the first transducer element 458 mounted to a base element 452 through a first mounting element 454 and the second transducer element 460 mounted to the base element 452 through a second mounting element 456. The first transducer element 458 may have a first emitting face 462 and a second emitting face 457, and the second transducer element 460 may have a third emitting face 459 and a fourth emitting face 464.

As shown in FIG. 11, a central axis $A10_2$ of the first transducer element 458 is positioned at a first angle $\theta10_3$ with respect to the vertical axis $A10_1$, and a central axis $A10_3$ of the second transducer element 460 is positioned at a second angle $\theta10_4$ with respect to the vertical axis $A10_1$. The first transducer element 458 and the second transducer element 460 in FIG. 11 are angled such that portions of the first transducer element 458 and the second transducer element 460 which are farther from the base element 452 are closer together and such that portions of the first transducer element 458 and the second transducer element 460 which are closer to the base element 452 are farther apart. It should be appreciated that the vertical axis $A10_1$ may, in some embodiments, further define a vertical plane from which the first transducer element 458 and the second transducer element 460 are angled. In some embodiments, the first angle $\theta10_3$ and the second angle $\theta10_4$ may be approximately 5 degrees, but in other embodiments, the first angle $\theta10_3$ and the second angle $\theta10_4$ may be any other angle values.

The first transducer element 458 and the second transducer element 460 may be positioned such that the gap 469 is formed therebetween. The gap 469 may be at least partially enclosed by a first barrier 466 and the second barrier 468 and may include fluid therein. In some embodiments, the fluid within the gap 469 may be polyurethane. In other embodiments, however, the fluid may be any other fluid.

The sonar system 450 may be connected to the sonar signal processor that is in electronic communication with the first transducer element 458 and the second transducer element 460, and the sonar signal processor may be operative to cause transmission of signals from the first transducer element 458 and the second transducer element 460 to cause a first acoustic beam 472 to be emitted from the first emitting face 462 in a first beam direction $B10_1$ into the underwater environment and a fourth acoustic beam 474 to be emitted from the fourth emitting face 464 in a second beam direction $B10_2$ into the underwater environment.

The sonar signal processor may also be operative to cause transmission of signals from the first transducer element 458 and the second transducer element 460 to cause second and third acoustic beams to be emitted from the second emitting face 457 and the third emitting face 459 into the gap 469. As described herein, the second and third acoustic beams emitted from the second emitting face 457 and the third emitting face 459 may be contained within the gap 469 such that a plurality of acoustic waves 470 fill the gap 469. In other words, the second and third acoustic beams that are emitted from the second emitting face 457 and the third emitting face 459 immediately combine together to form the plurality of acoustic waves 470.

The gap 469 between the first transducer element 458 and the second transducer element 460 may be configured to facilitate movement of the fluid therein so as to contribute to an emission of sound power in both the first beam direction $B10_1$ and the second beam direction $B10_2$. For example, the emissions of sound power into the gap 469 from the second emitting face 457 and the third emitting face 459 may be at least partially contained within the gap 469 between the first barrier 466 and the second barrier 468 such that the plurality of acoustic waves 470 bounce back and forth within the gap 469. The back and forth bouncing of the plurality of acoustic waves 470 within the gap 469 between the first barrier 466, the second barrier 468, the second emitting face 457, and the third emitting face 459 may cause the fluid within the gap 469 to move, and the movement of the fluid in the gap 469 may cause a first transmission of energy 476 through the first transducer element 458 and a second transmission of energy 478 through the second transducer element 460. The first transmission of energy 476 may cause an amplification of the first acoustic beam 472 in the first beam direction $B10_1$, and the second transmission of energy 478 may cause an amplification of the fourth acoustic beam 474 in the second beam direction $B10_2$. For example, the first acoustic beam 472 and the fourth acoustic beam 474 may be wider, farther reaching, and/or more powerful than they would otherwise be without the first transmission of energy 476 and the second transmission of energy 478. Other amplification effects are also contemplated.

In some embodiments, the second barrier 468 may further include an opening 482 configured to direct the fifth acoustic beam 480 in the third beam direction $B10_3$ from the gap 469. The opening 482 may be configured such that, when the second acoustic beam and the third acoustic beam are emitted from the emitting faces 457 and 459 into the gap 469, the second acoustic beam and the third acoustic beam are directed into an at least partially enclosed area formed by the gap 469 and then are directed out of the at least partially enclosed area in the third beam direction $B10_3$.

The sonar signal processor may be further configured to receive sonar return data generated by receipt of sonar return signals by the first transducer element 458 and/or the second transducer element 460, and then the sonar signal processor may generate, based on the sonar return data, sonar image data corresponding to generation of at least one sonar image of the underwater environment. The sonar image(s) that are generated may then be displayed on a screen of a marine electronic device.

Additionally, the sonar system 450 may include a beam reflector 453 having a first beam reflecting surface 488 and a second beam reflecting surface 490. The beam reflector 453 may be similar to the beam reflector 141 of FIG. 3. For example, in various embodiments, the beam reflector 453 may be utilized to redirect acoustic beam(s) emitted from the first transducer element 458 and/or the second transducer element 460 and, in some embodiments, to redirect return acoustic beam(s) toward the first transducer element 458 and/or the second transducer element 460.

Like the beam reflector 141 of FIG. 3, the beam reflector 453 of FIG. 11 may be disposed relative to the first and second transducer elements 458 and 460 such that the first and second beam reflecting surfaces 488 and 490 are positioned along the beam directions $B10_1$ and $B10_2$, respectively. The first beam reflecting surface 488 is positioned along the first beam direction $B10_1$ such that, when the first acoustic beam 472 is emitted, the first acoustic beam 472 impinges upon the first beam reflecting surface 488 and is reflected in a fourth beam direction $B10_4$ that is different from the first beam direction $B10_1$. After impinging on and reflecting off of the first beam reflecting surface 488, the first acoustic beam 472 turns into a sixth acoustic beam 484. Similarly, the second beam reflecting surface 490 is positioned along the second beam direction $B10_2$ such that, when the fourth acoustic beam 474 is emitted, the fourth acoustic beam 474 impinges upon the second beam reflecting surface 490 and is reflected in a fifth beam direction $B10_5$ that is different from the second beam direction $B10_2$. After impinging on and reflecting off of the second beam reflecting surface 490, the fourth acoustic beam 474 turns into a seventh acoustic beam 486.

The first beam reflecting surface 488 may be positioned at a first angle $\theta10_1$ with respect to a horizontal axis and/or plane, such as defined by the base element 452 in the embodiment depicted in FIG. 11. Similarly, the second beam reflecting surface 490 may be positioned at a second angle $\theta10_2$ with respect to the horizontal axis and/or plane. It should be appreciated that the angles $\theta10_1$ and $\theta10_2$ may be any angle with respect to a horizontal axis and/or plane, and the horizontal axis and/or plane may not be defined by the base element 452 (e.g., the base element 452 may also be disposed at an angle with respect to the horizontal axis and/or plane). The angles $\theta10_1$ and $\theta10_2$ may be configured such that desired orientations of the acoustic beams 484 and 486 are achieved after acoustic beams 472 and 474 reflect off of beam reflecting surfaces 488 and 490. For example, the angles $\theta10_1$ and $\theta10_2$ may be configured such that the first and second angles $\theta10_3$ and $\theta10_4$ of the first and second transducer elements 458 and 460 correspond to angles $\theta10_1$ and $\theta10_2$ in such a way so as to achieve desired patterns of the acoustic beams 472, 474, 484, and 486. In some embodiments, the angles $\theta10_1$ and $\theta10_2$ may be approximately 45 degrees, but in other embodiments, the angles $\theta10_1$ and $\theta10_2$ may be any other angle values.

It should be appreciated that, although the first and second beam reflecting surfaces 488 and 490 shown in FIG. 11 are configured to reflect acoustic beams 472 and 474 into acoustic beams 484 and 486, in some other embodiments, the beam reflector 453 may be modified so that acoustic beam 480 is reflected as well.

Example System Architecture

FIG. 12 shows a block diagram of a computing device, such as user device 603. The depicted computing device is an example marine electronic device 605. The marine electronic device 605 may include a number of different modules or components, each of which may comprise any device or means embodied in either hardware, software, or a combination of hardware and software configured to perform one or more corresponding functions. The marine electronic device may also be in communication with a network 602.

The marine electronic device 605 may also include one or more communications modules configured to communicate with one another in any of a number of different manners including, for example, via a network. In this regard, the communications module may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays may be included in a marine system 600.

The marine electronic device 605 may include a processor 610, a memory 620, a user interface 635, a display 640, one or more sensors (e.g., position sensor 645, other sensors 647, etc.), and a communication interface 630.

The processor 610 may be any means configured to execute various programmed operations or instructions stored in a memory device such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 610 as described herein. In this regard, the processor 610 may be configured to analyze electrical signals communicated thereto to provide or receive sonar data, sensor data, location data, and/or additional environmental data. For example, the processor 610 may be configured to receive sonar return data, generate sonar image data, and generate one or more sonar images based on the sonar image data.

In some embodiments, the processor 610 may be further configured to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other vehicles, e.g., watercraft, etc.

In an example embodiment, the memory 620 may include one or more non-transitory storage or memory devices such as, for example, volatile and/or non-volatile memory that may be either fixed or removable. The memory 620 may be configured to store instructions, computer program code, marine data, such as sonar data, chart data, location/position data, and other data associated with the navigation system in a non-transitory computer readable medium for use, such as by the processor for enabling the marine electronic device 605 to carry out various functions in accordance with example embodiments of the present invention. For example, the memory 620 could be configured to buffer input data for processing by the processor 610. Additionally or alternatively, the memory 620 could be configured to store instructions for execution by the processor 610.

The communication interface 630 may be configured to enable connection to external systems (e.g., an external network 602). In this manner, the marine electronic device 605 may retrieve stored data from a remote server 660 via the external network 602 in addition to or as an alternative to the onboard memory 620. Additionally or alternatively, the marine electronic device 605 may transmit or receive data, such as sonar signals, sonar returns, sonar image data or the like to or from a transducer assembly 662, more particularly to or from a sonar signal processor 665. In some embodiments, the marine electronic device 605 may also be configured to communicate with a propulsion system 609. The marine electronic device 605 may receive data indicative of operation of the propulsion system, such as engine or trolling motor running, running speed, or the like.

The position sensor 645 may be configured to determine the current position and/or location of the marine electronic device 605. For example, the position sensor 645 may comprise a GPS, bottom contour, inertial navigation system, such as machined electromagnetic sensor (MEMS), a ring laser gyroscope, or other location detection system.

The display 640, e.g., screen, may be configured to display images and may include or otherwise be in communication with a user interface 635 configured to receive input from a user. The display 640 may be, for example, a conventional LCD (liquid crystal display), a touch screen display, mobile device, or any other suitable display known in the art upon which images may be displayed.

In any of the embodiments, the display 640 may present one or more sets of marine data (or images generated from the one or more sets of data). Such marine data includes chart data, radar data, weather data, location data, position data, orientation data, sonar data, or any other type of information relevant to the watercraft. In some embodiments, the display 640 may be configured to present such marine data simultaneously as one or more layers or in split-screen mode. In some embodiments, a user may select any of the possible combinations of the marine data for display.

In some further embodiments, various sets of data, referred to above, may be superimposed or overlaid onto one another. For example, a route may be applied to (or overlaid onto) a chart (e.g., a map or navigational chart). Additionally or alternatively, depth information, weather information, radar information, sonar information, or any other navigation system inputs may be applied to one another.

The user interface 635 may include, for example, a keyboard, keypad, function keys, mouse, scrolling device, input/output ports, touch screen, or any other mechanism by which a user may interface with the system.

Although the display 640 of FIG. 12 is shown as being directly connected to the processor 610 and within the marine electronic device 605, the display 640 could alternatively be remote from the processor 610 and/or marine electronic device 605. Likewise, in some embodiments, the position sensor 645 and/or user interface 635 could be remote from the marine electronic device 605.

The marine electronic device 605 may include one or more other sensors 647 configured to measure environmental conditions. The other sensors 647 may include, for example, an air temperature sensor, a water temperature sensor, a current sensor, a light sensor, a wind sensor, a speed sensor, or the like.

The transducer assembly 662 may comprise one or more transducer(s) such as first transducer 669 and second transducer 668 that receive signals from and return signals to a sonar signal processor 665. In some embodiments, such as where first and second transducers 669 and 668 comprise a phased array or frequency-steered array, sonar signal processor 665 may comprise suitable beamforming hardware and/or software with which those of skill in the art are familiar and which may vary depending on the method of beamforming employed. In some embodiments, the sonar signal processor 665 may be configured to select individual transducer elements to gather sonar return data and/or cause transmission. Although depicted in the transducer assembly 662, it would be immediately understood by one of ordinary skill in the art that the sonar signal processor 665 may be a portion of the user device 603, the marine electronic device 605, the processing circuitry 607, the processor 610, or another remote device/system. Also, first and second transducers 669 and 668 may comprise transmit transducer elements, receive transducer elements, and/or transmit/receive transducer elements.

The propulsion system 609 may include a main propulsion motor and/or a trolling motor. The propulsion motor and/or the trolling motor may include one or more sensors to measure operation or speed of main propulsion motor and/or the trolling motor.

Example Flowchart(s)

Embodiments of the present invention provide methods, apparatus and computer program products for operating a sonar system. Various examples of the operations performed in accordance with embodiments of the present invention will now be provided with reference to FIG. 13.

FIG. 13 illustrates a flowchart according to an example method 500 for operating a sonar system according to an example embodiment. The operations illustrated in and described with respect to FIG. 13 may, for example, be performed by, with the assistance of, and/or under the control of one or more of the processor 610, memory 620, communication interface 630, user interface 635, position sensor 645, other sensor 647, transducer assembly 662, sonar signal processor 665, display 640, and/or propulsion system 609.

At operation 502, the method 500 may be configured to emit acoustic beam(s) from one or more transducer element (s). For example, in some embodiments, four or more acoustic beam may be emitted from emitting faces of two or more transducer elements that are positioned such that a gap is formed therebetween. Further, in various embodiments, a beam reflector may be provided. In various embodiments, the beam reflector has at least one beam reflecting surface in a fixed position relative to the transducer elements such that at least one of the emitted acoustic beams impinges upon the at least one beam reflecting surface.

At operation 504, the method 500 may be configured to receive sonar return data generated by receipt of sonar return signals by transducer element(s). In embodiments with a beam reflector, the sonar return signals may bounce off of the beam reflector before being received.

At operation 506, the method 500 may be configured to generate, based on the sonar return data, sonar image data corresponding to generation of at least one sonar image of the underwater environment. In some embodiments, a composite sonar image may be generated, while in other embodiments, multiple separate sonar images may be generated.

FIG. 13 illustrates a flowchart of a system, method, and computer program product according to an example embodiment. It will be understood that each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 620 and executed by, for example, the processor 610 and/or the sonar signal processor 665. As will be appreciated, any such computer program product may be loaded onto a computer or other programmable apparatus (for example, a marine electronic device 605 and/or transducer assembly 662) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 605 and/or transducer assembly 662) to cause a series of operations to be performed on the computer or other programmable apparatus to produce a computer-implemented process such that the instructions which execute on the computer or other programmable apparatus implement the functions specified in the flowchart block(s).

CONCLUSION

Based on the foregoing, it will be appreciated that embodiments of the invention provide systems and methods for utilizing a beam reflector in a sonar transducer assembly. As described herein, various embodiments may overcome issues encountered in prior art devices with having enough sound in the water. In some embodiments, the radiated acoustic energy may be more broadband, which may result in better imaging, such as obtaining better separation between closely-spaced objects. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A sonar system for generating one or more sonar images of an underwater environment, the sonar system comprising:

a first transducer element, the first transducer element having a first emitting face and an opposing third emitting face;

a second transducer element, the second transducer element having a second emitting face and an opposing fourth emitting face;

a first barrier;

a second barrier; and a sonar signal processor in electronic communication with the first transducer element and the second transducer element, the sonar signal processor operative to cause transmission of signals from the first transducer element and the second transducer element to cause at least one first acoustic beam to be emitted from the first emitting face in a first beam direction into the underwater environment and at least one second acoustic beam to be emitted from the second emitting face in a second beam direction into the underwater environment, wherein the first transducer element and the second transducer element are positioned in a spaced apart manner with a gap formed between the third emitting face of the first transducer element and the fourth emitting face of the second transducer element, wherein the first barrier, the second barrier, the third emitting face of the first transducer element and the fourth emitting face of the second transducer element form an enclosed volume within the gap so as to contain fluid within the enclosed volume, wherein acoustic energy emitted from both the first transducer element and the second transducer element into the enclosed volume bounces off at least the first barrier or the second barrier to cause movement of the fluid within the enclosed volume so as to contribute to an emission of sound power in both the first beam direction and the second beam direction.

2. The sonar system of claim 1, wherein the sonar signal processor is further configured to:

receive sonar return data generated by receipt of sonar return signals by at least one of the first transducer element or the second transducer element; and generate, based on the sonar return data, sonar image data corresponding to generation of at least one sonar image of the underwater environment.

3. The sonar system of claim 1, wherein the sonar signal processor is operative to cause transmission of signals from the first transducer element to cause a first acoustic beam to be emitted from the first emitting face in the first beam direction and a second acoustic beam to be emitted from the third emitting face into the gap, and wherein the sonar signal processor is operative to cause transmission of signals from the second transducer element to cause a third acoustic beam to be emitted from the second emitting face into the second beam direction and a fourth acoustic beam to be emitted from the fourth side emitting face into the gap.

4. The sonar system of claim 3, wherein, when the second acoustic beam and the fourth acoustic beam are emitted, the second acoustic beam and the fourth acoustic beam are directed into the enclosed volume and at least a portion of the acoustic energy is directed out of the enclosed volume in a third beam direction.

5. The sonar system of claim 3, wherein the sonar system further comprises a beam reflector mounted in a fixed position relative to the first transducer element and the second transducer element, wherein the beam reflector comprises at least one first beam reflecting surface positioned along the first beam direction such that, when the first acoustic beam is emitted, the first acoustic beam impinges upon the at least one first beam reflecting surface and is reflected in a fourth beam direction different than the first beam direction, wherein the beam reflector comprises at least one second beam reflecting surface positioned along the second beam direction such that, when the third acoustic beam is emitted, the third acoustic beam impinges upon the at least one second beam reflecting surface and is reflected in a fifth beam direction different than the second beam direction.

6. The sonar system of claim 5, wherein the fourth beam direction and the fifth beam direction are vertically downward.

7. The sonar system of claim 5, wherein the at least one first beam reflecting surface and the at least one second beam reflecting surface are straight.

8. The sonar system of claim 5, wherein the at least one first beam reflecting surface and the at least one second beam reflecting surface are integrated into one curved beam reflecting surface.

9. The sonar system of claim 5, wherein each of the at least one first beam reflecting surface and the at least one second beam reflecting surface is formed of a foam material.

10. The sonar system of claim 5, wherein the sonar return signals returned from the underwater environment are reflected off at least one of the at least one first beam reflecting surface or the at least one second beam reflecting surface prior to being received by the first transducer element or the second transducer element.

11. The sonar system of claim 5, wherein the first transducer element is positioned at a first angle with respect to a vertical plane, wherein the second transducer element is positioned at a second angle with respect to the vertical plane, wherein the at least one first beam reflecting surface is positioned at a third angle with respect to a horizontal plane, wherein the at least one second beam reflecting surface is positioned at a fourth angle with respect to the horizontal plane, and wherein the first angle and the second angle correspond to the third angle and the fourth angle in such a way so as to achieve desired patterns of the first acoustic beam, the second acoustic beam, the third acoustic beam, and the fourth acoustic beam.

12. The sonar system of claim 11, wherein each of the first angle and the second angle is about 5 degrees, and wherein each of the third angle and the fourth angle is about 45 degrees.

13. The sonar system of claim 1, wherein the first emitting face of the first transducer element and the second emitting face of the second transducer element are parallel.

14. The sonar system of claim 1, wherein the first transducer element comprises a first foam element configured to focus the at least one first acoustic beam out of the first emitting face, and wherein the second transducer element comprises a second foam element configured to focus the at least one second acoustic beam out of the second emitting face.

15. The sonar system of claim 1, wherein the fluid is comprised of polyurethane.

16. The sonar system of claim 1, wherein each of the first transducer element and the second transducer element comprises a piezoelectric ceramic disc.

17. The sonar system of claim 1, wherein each of the at least one first acoustic beam and the at least one second acoustic beam is conical.

18. A sonar system for generating one or more sonar images of an underwater environment, the sonar system comprising:

a first transducer element, the first transducer element having a first emitting face and a second emitting face, wherein the first emitting face is disposed on an opposite side of the first transducer element from the second emitting face;

a second transducer element, the second transducer element having a third emitting face and a fourth emitting face, wherein the third emitting face is disposed on an opposite side of the second transducer element from the fourth emitting face;

a first barrier;

a second barrier; and a sonar signal processor in electronic communication with the first transducer element and the second transducer element, the sonar signal processor operative to cause transmission of signals from the first transducer element and the second transducer element to cause a first acoustic beam to be emitted from the first emitting face in a first beam direction, a second acoustic beam to be emitted from the second emitting face in a second beam direction, a third acoustic beam to be emitted from the third emitting face in a third beam direction, and a fourth acoustic beam to be emitted from the fourth emitting face in a fourth beam direction, wherein the first beam direction and the second beam direction intersect, wherein, when the second acoustic beam and the third acoustic beam are emitted, the second acoustic beam and the third acoustic beam are directed into a fully enclosed volume defined by the first barrier, the second barrier, the second emitting face of the first transducer element and the third emitting face of the second transducer element.

19. A sonar transducer assembly comprising:

a first transducer element, the first transducer element having a first emitting face and an opposing third emitting face, wherein the first transducer element is in electronic communication with a sonar signal processor, and wherein the sonar signal processor is operative to cause transmission of signals from the first transducer element to cause at least one first acoustic beam to be emitted from the first emitting face in a first beam direction; and a second transducer element, the second transducer element having a second emitting face and an opposing fourth emitting face, wherein the second transducer element is in electronic communication with the sonar signal processor, and wherein the sonar signal processor is operative to cause transmission of signals from the second transducer element to cause at least one second acoustic beam to be emitted from the second emitting face in a second beam direction, wherein the first transducer element and the second transducer element are positioned in a spaced apart manner with a gap formed between the third emitting face of the first transducer element and the fourth emitting face of the second transducer element, wherein a first barrier, a second barrier, the third emitting face of the first transducer element and the fourth emitting face of the second transducer element form an enclosed volume within the gap so as to contain fluid within the enclosed volume, wherein acoustic energy emitted from both the first transducer element and the second transducer element into the enclosed volume bounces off at least the first barrier or the second barrier to cause movement of the fluid within the enclosed volume so as to contribute to an emission of sound power in both the first beam direction and the second beam direction.

\* \* \* \* \*